US009564629B2

(12) United States Patent
Zhamu et al.

(10) Patent No.: US 9,564,629 B2
(45) Date of Patent: Feb. 7, 2017

(54) HYBRID NANO-FILAMENT ANODE COMPOSITIONS FOR LITHIUM ION BATTERIES

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 12/006,209

(22) Filed: Jan. 2, 2008

(65) Prior Publication Data
US 2009/0169996 A1 Jul. 2, 2009

(51) Int. Cl.
| | |
|---|---|
| *H01M 4/38* | (2006.01) |
| *H01M 4/48* | (2010.01) |
| *H01M 4/60* | (2006.01) |
| *H01M 4/139* | (2010.01) |
| *D01F 9/21* | (2006.01) |
| *D04H 3/02* | (2006.01) |
| *D04H 3/16* | (2006.01) |
| *D06M 10/06* | (2006.01) |
| *D06M 11/46* | (2006.01) |
| *D06M 11/47* | (2006.01) |
| *D06M 11/48* | (2006.01) |
| *D06M 11/49* | (2006.01) |
| *D06M 11/71* | (2006.01) |
| *D06M 11/78* | (2006.01) |
| *D06M 11/83* | (2006.01) |
| *H01M 4/04* | (2006.01) |
| *H01M 4/74* | (2006.01) |
| *D06M 101/40* | (2006.01) |
| *H01M 4/1391* | (2010.01) |
| *H01M 4/1395* | (2010.01) |
| *D01D 5/00* | (2006.01) |

(52) U.S. Cl.
CPC .............. *H01M 4/139* (2013.01); *D01F 9/21* (2013.01); *D04H 3/02* (2013.01); *D04H 3/16* (2013.01); *D06M 10/06* (2013.01); *D06M 11/46* (2013.01); *D06M 11/47* (2013.01); *D06M 11/485* (2013.01); *D06M 11/49* (2013.01); *D06M 11/71* (2013.01); *D06M 11/78* (2013.01); *D06M 11/83* (2013.01); *H01M 4/049* (2013.01); *H01M 4/0416* (2013.01); *H01M 4/0428* (2013.01); *H01M 4/0438* (2013.01); *H01M 4/0452* (2013.01); *H01M 4/0471* (2013.01); *H01M 4/74* (2013.01); *D01D 5/0007* (2013.01); *D06M 2101/40* (2013.01); *H01M 4/1391* (2013.01); *H01M 4/1395* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 5,344,726 A | 9/1994 | Tanaka et al. | |
| 5,635,151 A | 6/1997 | Zhang et al. | |
| 5,908,715 A | 6/1999 | Liu et al. | |
| 5,965,296 A | 10/1999 | Nishimura et al. | |
| 6,007,945 A | 12/1999 | Jacobs et al. | |
| 6,040,092 A | 3/2000 | Yamada et al. | |
| 6,087,043 A | 7/2000 | Tossici et al. | |
| 6,143,448 A | 11/2000 | Fauteux et al. | |
| 6,280,697 B1 * | 8/2001 | Zhou | B82Y 30/00 423/414 |
| 6,316,143 B1 | 11/2001 | Foster et al. | |
| 6,524,744 B1 | 2/2003 | Clerc et al. | |
| 6,858,318 B2 | 2/2005 | Kogiso et al. | |
| 6,872,330 B2 | 3/2005 | Mack et al. | |
| 7,094,499 B1 | 8/2006 | Hung | |
| 2003/0102222 A1 * | 6/2003 | Zhou | B82Y 30/00 205/109 |
| 2005/0058896 A1 * | 3/2005 | Nomura et al. | 429/142 |
| 2006/0040182 A1 * | 2/2006 | Kawakami et al. | 429/218.1 |
| 2006/0237697 A1 | 10/2006 | Kosuzu et al. | |
| 2006/0263689 A1 | 11/2006 | Ishihara et al. | |
| 2007/0020519 A1 | 1/2007 | Kim et al. | |

(Continued)

OTHER PUBLICATIONS

Kim et al., "Characteristics of supercapaitor electrodes of PBI-based carbon nanofiber web prepared by electrospinning", Electrochimica Acta 50 (2004) 877-881.*
Kumar et al., "Structural and Optical Properties of Electrospun TiO2 Nanofibers", Chem. Mater. 2007, 19, 6536-6542.*
Kim et al. "Fabrication of Electrospinning-Derived Carbon Nanofiber Webs for the Anode Material of Lithium-Ion Secondary Batteries", Adv. Funct. Mater. 2006, 16, 2393-2397.*
U.S. Appl. No. 11/509,424, filed Aug. 25, 2006, B. Z. Jang, et al.
U.S. Appl. No. 11/526,489, filed Sep. 26, 2006, B. Z. Jang, et al.
U.S. Appl. No. 11/709,274, filed Feb. 22, 2007, B. Z. Jang, et al.
U.S. Appl. No. 11/787,442, filed Apr. 17, 2007, A. Zhamu, et al.
U.S. Appl. No. 11/800,728, filed May 8, 2007, A. Zhamu, et al.

(Continued)

*Primary Examiner* — Ladan Mohaddes

(57) ABSTRACT

This invention provides a hybrid nano-filament composition for use as an electrochemical cell electrode. The composition comprises: (a) an aggregate of nanometer-scaled, electrically conductive filaments that are substantially interconnected, intersected, or percolated to form a porous, electrically conductive filament network comprising substantially interconnected pores, wherein the filaments have an elongate dimension and a first transverse dimension with the first transverse dimension being less than 500 nm (preferably less than 100 nm) and an aspect ratio of the elongate dimension to the first transverse dimension greater than 10; and (b) micron- or nanometer-scaled coating that is deposited on a surface of the filaments, wherein the coating comprises an anode active material capable of absorbing and desorbing lithium ions and the coating has a thickness less than 20 μm (preferably less than 1 μm). Also provided is a lithium ion battery comprising such an electrode as an anode. The battery exhibits an exceptionally high specific capacity, an excellent reversible capacity, and a long cycle life.

13 Claims, 14 Drawing Sheets

(56) References Cited

U.S. PATENT DOCUMENTS

| | | | |
|---|---|---|---|
| 2007/0031730 A1 | 2/2007 | Kawakami et al. | |
| 2007/0122701 A1 | 5/2007 | Yamaguchi | |
| 2007/0148544 A1 | 6/2007 | Le | |
| 2008/0261116 A1* | 10/2008 | Burton et al. | 429/231.8 |
| 2008/0286656 A1* | 11/2008 | Cho et al. | 429/231.95 |
| 2009/0068553 A1* | 3/2009 | Firsich | 429/122 |
| 2009/0105796 A1* | 4/2009 | Atanasoska et al. | 607/152 |

OTHER PUBLICATIONS

T. Zheng, Q. Zhong, and J. R. Dahn, J. Electrochem. Soc. 142 (1995) L211.
J. S. Xue and J. R. Dahn, J. Electrochem. Soc. 142 (1995) 3668.
F. Disma, L. Aymard, and J.-M. Tarascon, J. Electrochem. Soc., 143 (1996) 3959.
E. Peled, C. Menachem, A. Melman, J. Electrochem. Soc. 143 (1996) L4.
U. Rothlisberger and M. L. Klein, J. Am. Chem. Soc., 117, 42 (1995).
R. Yazami and M. Deschamps, J. Power Sources, 54 (1995) 411.
Y. Ein-Eli, V.R. Koch, J. Electrochem. Soc. 144 (1997) 2968.
R.S. Wagner and W.C. Ellis, Vapor-liquid—solid mechanism of single crystal growth, Appl Phys Letter, 4 (1964), pp. 89-90.
S. Bourderau, T. Brousse, and D. M. Schleich, J. Power Source, 81-82 (1999) 233.
J. Jung, M. Park, Y. Yoon, K. Kim, and S. Joo, J. Power Sources, 115 (2003) 346.
K.P. De Jong and J.W. Geus, Carbon nanofibers: catalytic synthesis and applications, Catal Rev., 42 (2000), pp. 481-510.
D. Takagi, Y. Homma, H. Hibino, S. Suzuki and Y. Kobayashi, Single-walled carbon nanotube growth from highly activated metal nanoparticles, Nano Letter, 6 (2006) 2642-45.
K. W. Kolasinski, "Catalytic growth of nanowires," Current Opinion in Solid State and Materials Science, 10 (2006) pp. 182-191.
F.D. Wang, A.G. Dong, J.W. Sun, R. Tang, H. Yu and W.E. Buhro, Solution-liquid—solid growth of semiconductor nanowires, Inorg Chem., 45 (2006) pp. 7511-7521.
E. C. Walter, et al., "Electrodeposition of Portable Metal Nanowire Arrays," in Physical Chem. of Interfaces and Nanomater, Eds. J. Zhang, et al. Proc. SPIE 2002, 9 pages.
C. K. Chan, et al., "High-Performance Lithium Battery Anodes Using Silicon Nanowires," Nature Nanotechnology, published online Dec. 16, 2007, 5 pages.
J.M. Deitzel, et al, "The Effect of Processing Variables on the Morphology of Electro-spun Nano-fibers and Textiles," Polymer 42 (2001) pp. 261-272.
A.F. Spivak, Y.A. Dzenis and D.H. Reneker, "A Model of Steady State Jet in the Electro-spinning Process," Mech. Res. Commun. 27 (2000) pp. 37-42.
I. D. Norris, et al., "Electrostatic Fabrication of Ultrafine Conducting Fibers: Polyaniline/Polyethylene oxide Blends," Synthetic Metals, 114 (2000) 109-114.
S. Ohara, et al., "Li Insertion/Extraction Reaction at a Si Film Evaporated on a Ni Foil," J. Power Source, 119-121 (2003) 591-596.
T. Takamura, et al., "A Vacuum Deposited Si Film Having a Li Extraction Capacity Over 2000 mAh/g with a Long Cycle Life," J. Power Source, 129 (2004) 96-100.
M. Uehara, et al., "Thick Vacuum Deposited Silicon Films Suitable for the Anode of Li-ion Battery," J. Power Source, 146 (2005) 441-444.
S. Ohara, et al., "A Thin Film Silicon Anode for Li-ion Batteries Having a very Large Specific Capacity and a Long Cycle Life," J. Power Source, 136 (2004) 303-306.
J. Niu, et al "Improvement of Usable Capacity and Cyclability of Si-Based Anode Mater. for Li Batt. by Sol-Gel Graphite," Electrochem & Solid-State Letters, 5(6) (2002) A107.
T. L. Kulova, et al., "Lithium Insertion into Amorphous Silicon Thin-Film Electrodes," J. Electroanalytical Chemistry, 600 (2007) 217-225.
H. J. Jung, et al., "Amorphous Silicon Anode for Lithium-Ion Rechargeable Batteries," J. Power Source, 115 (2003) 346-351.
K. L. Lee, et al., "Electrochemical Characteristics of a-Si Thin Film Anode for Li-ion Rechargeable Batteries," J. Power Source, 129 (2004) 270-274.
C. J. Kim, et al., "Critical Size of a Nano SnO2 Electrode for Li-Secondary Battery," Chem., Mater., 17 (2005) 3297-3301.
J. Read, et al., "SnO2-Carbon Composites for Lithium-Ion Battery Anode," J. Power Source, 96 (2001) 277-281.
L. Yuan, et al., "Nano-structured SnO2-Carbon Composites Obtained by in-situ Spray Pyrolysis Method as Anodes in Lithium Batteries," J. Power Source, 146 (2005) 180-184.
S. Yang, et al., "Anodes for Lithium Batteries: Tin Revisited," Electrochemistry Communications, 5 (2003) 587-590.
Kim, C. et al. "Self-Sustained Thin Webs Consisting of Porous Carbon Nanofibers for Supercapacitors via the Electrospinning of Polyacrylonitrile Solutions containing Zinc Chloride," Advanced Materials, vol. 19, pp. 2341-2346 (2007).
Ju, Y. et al. "Electrospun Activated Carbon Nanofibers Electrodes Based on Polymer Blends," Journal of the Electrochemical Society, vol. 156 (6), pp. A489-A494 (2009).
Product information and product data sheet for Pyrograf I, High Resolution SEM of Pyrograf I Fibers by Applied Sciences, Inc.
Zussman, E. et al. "Mechanical and structural characterization of electrospun PAN-derived carbon nanofibers," Carbon, vol. 43, pp. 2175-2185 (2005).
Zhou, Z. et al. "Development of carbon nanofibers from aligned electrospun polyacrylonitrile nanofiber bundles and characterization of their microstructural, electrical, and mechanical properties," Polymer, vol. 50, pp. 2999-3006 (2009).

\* cited by examiner

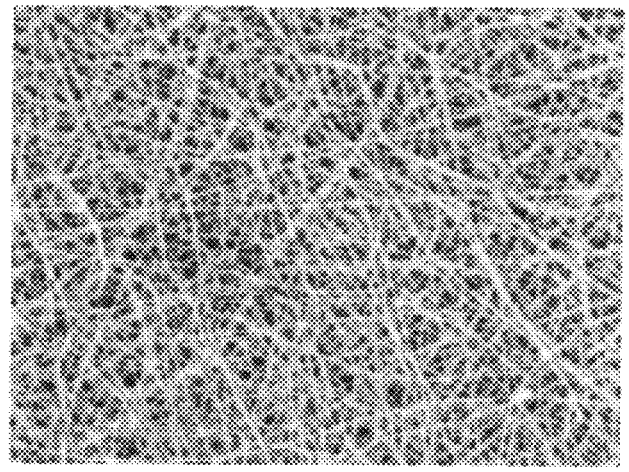
FIG. 6(A)  200 nm
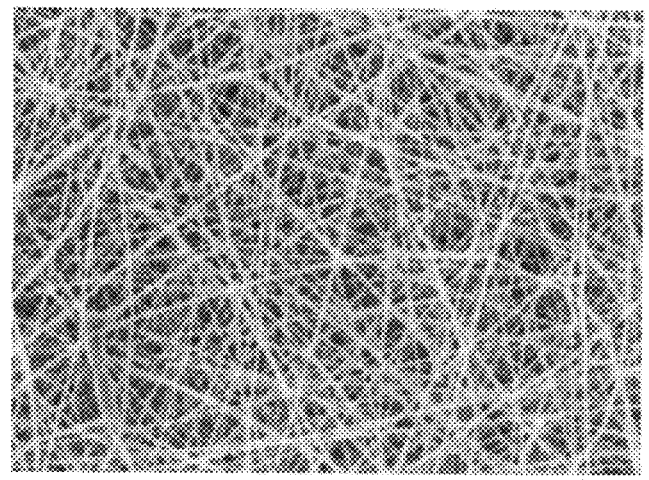
FIG. 6(B)  150 nm

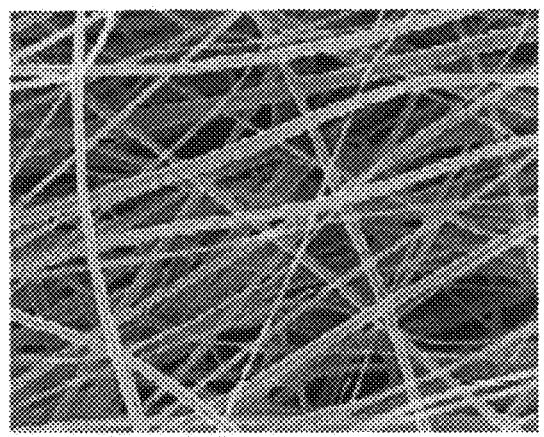
FIG. 7(A) —100 nm
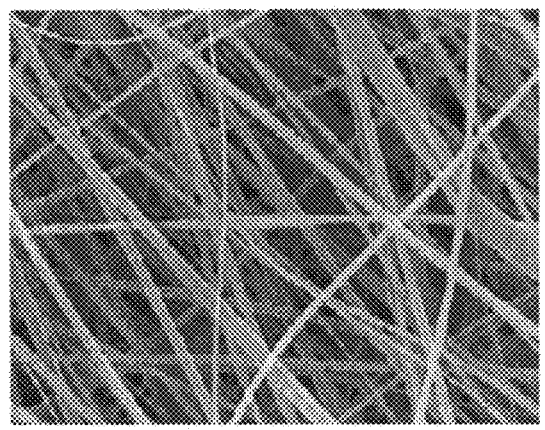
FIG. 7(B) —100 nm

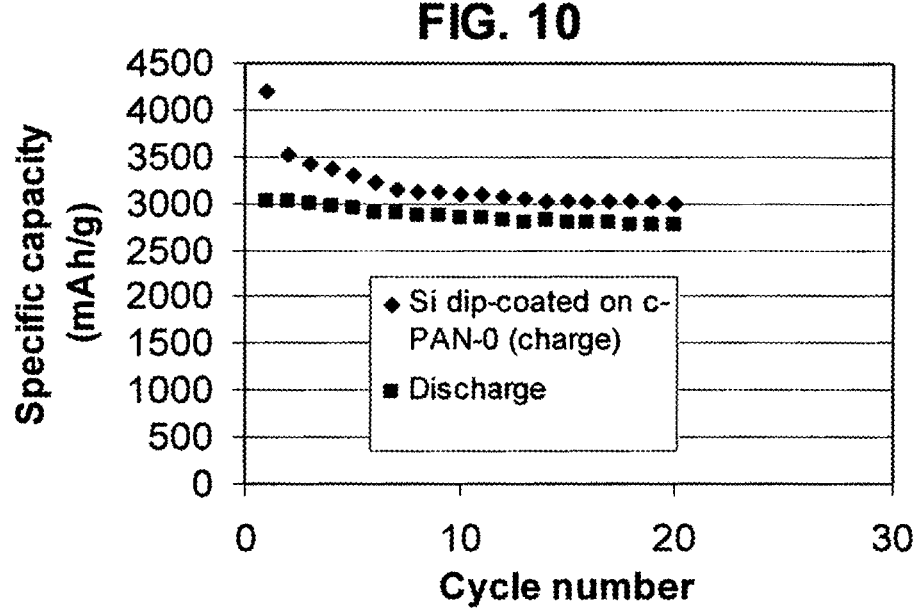

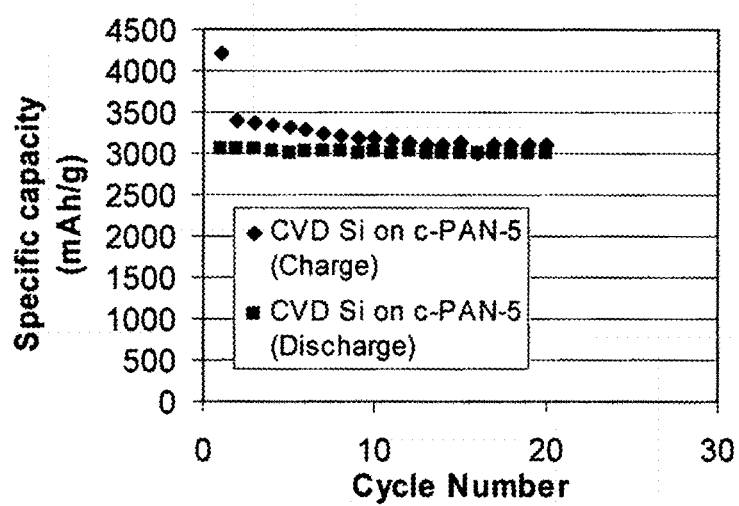

HYBRID NANO-FILAMENT ANODE COMPOSITIONS FOR LITHIUM ION BATTERIES

This is a co-pending application of (a) Aruna Zhamu, "NANO GRAPHENE PLATELET-BASED COMPOSITE ANODE COMPOSITIONS FOR LITHIUM ION BATTERIES," U.S. patent application Ser. Nos. 11/982,672 (Nov. 5, 2007) and (b) Aruna Zhamu and Bor Z. Jang, "HYBRID ANODE COMPOSITIONS FOR LITHIUM ION BATTERIES," U.S. patent application Ser. No. 11/982,662 (Nov. 5, 2007).

FIELD OF THE INVENTION

The present invention provides a hybrid, nano-scaled filamentary material composition for use as an anode material in a secondary or rechargeable battery, particularly lithium-ion battery.

BACKGROUND

The description of prior art will be primarily based on the list of references presented at the end of this section.

Concerns over the safety of earlier lithium secondary batteries led to the development of lithium ion secondary batteries, in which pure lithium metal sheet or film was replaced by carbonaceous materials as the anode. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized.

The maximum amount of lithium that can be reversibly intercalated into the interstices between graphene planes of a perfect graphite crystal is generally believed to occur in a graphite intercalation compound represented by $Li_xC_6(x=1)$, corresponding to a theoretical specific capacity of 372 mAh/g. In other graphitized carbon materials than pure graphite crystals, there exists a certain amount of graphite crystallites dispersed in or bonded by an amorphous or disordered carbon matrix phase. The amorphous phase typically can store lithium to a specific capacity level higher than 372 mAh/g, up to 700 mAh/g in some cases, although a specific capacity higher than 1,000 mAh/g has been sporadically reported. Hence, the magnitude of x in a carbonaceous material $Li_xC_6$ varies with the proportion of graphite crystallites and can be manipulated by using different processing conditions, as exemplified in [Refs. 1-7]. An amorphous carbon phase alone tends to exhibit a low electrical conductivity (high charge transfer resistance) and, hence, a high polarization or internal power loss. Conventional amorphous carbon-based anode materials also tend to give rise to a high irreversible capacity.

The so-called "amorphous carbons" commonly used as anode active materials are typically not purely amorphous, but contain some micro- or nano-crystallites with each crystallite being composed of a small number of graphene sheets (basal planes) that are stacked and bonded together by weak van der Waals forces. The number of graphene sheets varies between one and several hundreds, giving rise to a c-directional dimension (thickness Lc) of typically 0.34 nm to 100 nm. The length or width (La) of these crystallites is typically between tens of nanometers to microns. Among this class of carbon materials, soft and hard carbons made by low-temperature pyrolysis (550-1,000° C.) exhibit a reversible capacity of 400-800 mAh/g in the 0-2.5 V range [Refs. 1-3]. Dahn et al. have made the so-called house-of-cards carbonaceous material with enhanced capacities approaching 700 mAh/g [Refs. 1,2]. Tarascon's research group obtained enhanced capacities of up to 700 mAh/g by milling graphite, coke, or carbon fibers [Ref. 3]. Dahn et al. explained the origin of the extra capacity with the assumption that in disordered carbon containing some dispersed graphene sheets (referred to as house-of-cards materials), lithium ions are adsorbed on two sides of a single graphene sheet [Refs. 1,2]. It was also proposed that Li readily bonded to a proton-passivated carbon, resulting in a series of edge-oriented Li—C—H bonds. This provides an additional source of $Li^+$ in some disordered carbons [Ref. 5]. Other researchers suggested the formation of Li metal mono-layers on the outer graphene sheets [Ref. 6] of graphite nano-crystallites. The amorphous carbons of Dahn et al. were prepared by pyrolyzing epoxy resins and may be more correctly referred to as polymeric carbons. Polymeric carbon-based anode materials were also studied by Zhang, et al. [Ref. 8] and Liu, et al. [Ref. 9].

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies $0<a\leq5$) has been investigated as potential anode materials. This class of anode material has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, for the anodes composed of these materials, pulverization (fragmentation of the alloy particles) proceeds with the progress of the charging and discharging cycles due to expansion and contraction of the anode during the absorption and desorption of the lithium ions. The expansion and contraction also tend to result in reduction in or loss of particle-to-particle contacts or contacts between the anode and its current collector. These adverse effects result in a significantly shortened charge-discharge cycle life.

To overcome the problems associated with such mechanical degradation, composites composed of small, electrochemically active particles supported by less active or non-active matrices have been proposed for use as an anode material. Examples of these active particles are Si, Sn, and $SnO_2$. However, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

For instance, as disclosed in U.S. Pat. No. 6,007,945 (Dec. 28, 1999) by Jacobs, et al., a solid solution of titanium dioxide and tin dioxide was utilized as the anode active substance in the negative electrode of a rechargeable lithium battery. The density of the negative electrode made was 3.65 g/cm³, and the reversible capacity of the negative electrode containing $TiO_2$—$SnO_2$ in a ratio of 39:61 by weight, was found to be 1130 mAh/cm³. This was equivalent to 309.6 mAh/g, although the obtained rechargeable lithium battery was calculated to have energy density of 207 watt-hour per liter. Furthermore, the nano particles of the anode material react with the electrolyte during the charge-discharge cycles, resulting in reduced long-term utility.

As described in U.S. Pat. No. 6,143,448 (Nov. 7, 2000) issued to Fauteux et al., a composite was formed by mixing carbon with a metal salt in water, followed by evaporation, heating, and further treatment. The process produces a composite with many pores, which are not always preferred. The best achievable capacity was reported to be in the range of 750-2,000 mAh/cm$^3$. With a density of 4 g/cm$^3$, this implies a maximum capacity of 500 mAh/g In U.S. Pat. No. 7,094,499 (Aug. 22, 2006), Hung disclosed a method of forming a composite anode material. The steps include selecting a carbon material as a constituent part of the composite, chemically treating the selected carbon material to receive nano particles, incorporating nano particles into the chemically treated carbon material, and removing surface nano particles from an outside surface of the carbon material with incorporated nano particles. A material making up the nano particles forms an alloy with lithium. The resulting carbon/nanoparticle composite anodes did not exhibit any significant increase in capacity, mostly lower than 400 mAh/g.

In summary, the prior art has not demonstrated a composite material that has all or most of the properties desired for use in an anode for the lithium-ion battery. Thus, there is a need for a new anode for lithium-ion batteries that has a high cycle life, high reversible capacity, and low irreversible capacity. There is also a need for a method of readily or easily producing such a material.

REFERENCES

1. T. Zheng, Q. Zhong, and J. R. Dahn, J. Electrochem. Soc. 142 (1995) L211.
2. J. S. Xue and J. R. Dahn, J. Electrochem. Soc. 142 (1995) 3668.
3. F. Disma, L. Aymard, and J.-M. Tarascon, J. Electrochem. Soc., 143 (1996) 3959.
4. E. Peled, C. Menachem, A. Melman, J. Electrochem. Soc. 143 (1996) L4.
5. U. Rothlisberger and M. L. Klein, J. Am. Chem. Soc., 117, 42 (1995).
6. R. Yazami and M. Deschamps, J. Power Sources, 54 (1995) 411.
7. Y. Ein-Eli, V. R. Koch, J. Electrochem. Soc. 144 (1997) 2968.
8. Zhang, et al., "Carbon Electrode Materials for Lithium Battery Cells and Method of Making Same," U.S. Pat. No. 5,635,151 (Jun. 3, 1997).
9. Liu, et al., "Composite Carbon Materials for Lithium Ion Batteries, and Method of Producing Same," U.S. Pat. No. 5,908,715 (Jun. 1, 1999).
10. C. C. Hung, "Carbon Materials Metal/Metal Oxide Nanoparticle Composite and Battery Anode Composed of the Same, U.S. Pat. No. 7,094,499 (Aug. 22, 2006).
11. D. Clerc, et al., "Multiphase Material and Electrodes Made Therefrom," U.S. Pat. No. 6,524,744 (Feb. 25, 2003).
12. D. L. Foster, et al, "Electrode for Rechargeable Lithium-Ion Battery and Method for Fabrication," U.S. Pat. No. 6,316,143 (Nov. 13, 2001).
13. D. B. Le, "Silicon-Containing Alloys Useful as Electrodes for Lithium-Ion Batteries," US 2007/0148544 (Pub. Jun. 28, 2007).
14. H. Yamaguchi, "Anode Material, Anode and Battery," US 2007/0122701 (Pub. May 31, 2007).
15. S. Kawakami, et al., "Electrode Material for Anode of Rechargeable Lithium Battery," US 2007/0031730 (Pub. Feb. 8, 2007).
16. H. Kim, et al., "Anode Active Material, Manufacturing Method Thereof, and Lithium Battery Using the Anode Active Material," US 2007/0020519 (Pub. Jan. 25, 2007).
17. H. Ishihara, "Anode Active Material and Battery," US 2006/0263689 (Pub. Nov. 23, 2006).
18. T. Kosuzu, et al., "Electrode Material for Rechargeable Lithium Battery," US 2006/0237697 (Pub. Oct. 26, 2006).
19. R. S. Wagner and W. C. Ellis, Vapor-liquid-solid mechanism of single crystal growth, Appl Phys Letter, 4 (1964), pp. 89-90.
20. K. P. De Jong and J. W. Geus, Carbon nanofibers: catalytic synthesis and applications, *Catal Rev.*, 42 (2000), pp. 481-510.
21. D. Takagi, Y. Homma, H. Hibino, S. Suzuki and Y. Kobayashi, Single-walled carbon nanotube growth from highly activated metal nanoparticles, *Nano Letter*, 6 (2006), pp. 2642-2645.
22. Kurt W. Kolasinski, "Catalytic growth of nanowires: Vapor-liquid-solid, vapor-solid-solid, solution-liquid-solid and solid-liquid-solid growth," Current Opinion in Solid State and Materials Science, 10 (2006) pp. 182-191.
23. F. D. Wang, A. G. Dong, J. W. Sun, R. Tang, H. Yu and W. E. Buhro, Solution-liquid-solid growth of semiconductor nanowires, Inorg Chem., 45 (2006) pp. 7511-7521.
24. E. C. Walter, et al., "Electrodeposition of Portable Metal Nanowire Arrays," in Physical Chemistry of Interfaces and Nanomaterials, Eds. Jin Z. Zhang and Zhong L. Wang, Proc. SPIE 2002, 9 pages.
25. M. Kogiso and T. Shimizu, "Metal Nanowire and Process for Producing the Same," U.S. Pat. No. 6,858,318 (Feb. 22, 2005).
26. C. K. Chan, et al., "High-Performance Lithium Battery Anodes Using Silicon Nanowires," Nature Nanotechnology, published online 16 Dec. 2007, 5 pages.
27. J. J. Mack, et al., "Chemical Manufacture of Nanostructured Materials," U.S. Pat. No. 6,872,330 (Mar. 29, 2005).
28. Bor Z. Jang, Aruna Zhamu, and Jiusheng Guo, "Process for Producing Nano-scaled Platelets and Nanocomposites," U.S. patent application Ser. No. 11/509,424 (Aug. 25, 2006).
29. Bor Z. Jang, Aruna Zhamu, and Jiusheng Guo, "Mass Production of Nano-scaled Platelets and Products," U.S. patent application Ser. No. 11/526,489 (Sep. 26, 2006).
30. Bor Z. Jang, Aruna Zhamu, and Jiusheng Guo, "Method of Producing Nano-scaled Graphene and Inorganic Platelets and Their Nanocomposites," US patent application Ser. No. 11/709,274 (Feb. 22, 2007).
31. Aruna Zhamu, JinJun Shi, Jiusheng Guo, and Bor Z. Jang, "Low-Temperature Method of Producing Nano-scaled Graphene Platelets and Their Nanocomposites," U.S. patent application Ser. No. 11/787,442 (Apr. 17, 2007).
32. Aruna Zhamu, Jinjun Shi, Jiusheng Guo and Bor Z. Jang, "Method of Producing Exfoliated Graphite, Flexible Graphite, and Nano-Scaled Graphene Plates," U.S. patent application Ser. No. 11/800,728 (May 8, 2007).
33. J. M. Deitzel, J. Kleinmeyer, D. Harris and N. C. Beck Tan, "The Effect of Processing Variables on the Morphology of Electro-spun Nano-fibers and Textiles," *Polymer* 42 (2001) pp. 261-272.
34. A. F. Spivak, Y. A. Dzenis and D. H. Reneker, "A Model of Steady State Jet in the Electro-spinning Process," *Mech. Res. Commun.* 27 (2000) pp. 37-42.

35. I. D. Norris, et al., "Electrostatic Fabrication of Ultrafine Conducting Fibers: Polyaniline/Polyethylene oxide Blends," Synthetic Metals, 114 (2000) 109-114.
36. S. Ohara, et al., "Li Insertion/Extraction Reaction at a Si Film Evaporated on a Ni Foil," J. Power Source, 119-121 (2003) 591-596.
37. T. Takamura, et al., "A Vacuum Deposited Si Film Having a Li Extraction Capacity Over 2000 mAh/g with a Long Cycle Life," J. Power Source, 129 (2004) 96-100.
38. M. Uehara, et al., "Thick Vacuum Deposited Silicon Films Suitable for the Anode of Li-ion Battery," J. Power Source, 146 (2005) 441-444.
39. S. Ohara, et al., "A Thin Film Silicon Anode for Li-ion Batteries Having a very Large Specific Capacity and a Long Cycle Life," J. Power Source, 136 (2004) 303-306.
40. J. Niu and J. Y. Lee, "Improvement of Usable Capacity and Cyclability of Silicon-Based Anode Materials for Lithium Batteries by Sol-Gel Graphite Matrix," Electrochemical and Solid-State Letters, 5(6) (2002) A107-A110.
41. T. L. Kulova, et al., "Lithium Insertion into Amorphous Silicon Thin-Film Electrodes," J. Electroanalytical Chemistry, 600 (2007) 217-225.
42. S. Bourderau, et al., "Amorphous Silicon as a Possible Anode Material for Li-ion Batteries," J. Power Source, 81-82 (1999) 233-236.
43. K. L. Lee, et al., "Electrochemical Characteristics of a-Si Thin Film Anode for Li-ion Rechargeable Batteries," J. Power Source, 129 (2004) 270-274.
44. H. J. Jung, et al., "Amorphous Silicon Anode for Lithium-Ion Rechargeable Batteries," J. Power Source, 115 (2003) 346-351.
45. C. J. Kim, et al., "Critical Size of a Nano $SnO_2$ Electrode for Li-Secondary Battery," Chem., Mater., 17 (2005) 3297-3301.
46. J. Read, et al., "$SnO_2$-Carbon Composites for Lithium-Ion Battery Anode," J. Power Source, 96 (2001) 277-281.
47. L. Yuan, et al., "Nano-structured $SnO_2$-Carbon Composites Obtained by in-situ Spray Pyrolysis Method as Anodes in Lithium Batteries," J. Power Source, 146 (2005) 180-184.
48. S. Yang, et al., "Anodes for Lithium Batteries: Tin Revisited," Electrochemistry Communications, 5 (2003) 587-590.

SUMMARY OF THE INVENTION

The present invention provides a hybrid, nano-scaled filamentary material composition for use as an anode material in a secondary battery, particularly a lithium-ion battery. The material composition comprises (a) an aggregate of nanometer-scaled, electrically conductive filaments that are substantially interconnected, intersected, or percolated to form a porous, electrically conductive filament network, wherein the filament network comprises substantially interconnected pores and the filaments have an elongate dimension and a first transverse dimension (diameter or thickness) with the first transverse dimension being less than 500 nm (preferably less than 100 nm) and an aspect ratio of the elongate dimension to the first transverse dimension being greater than 10; and (b) micron- or nanometer-scaled coating that is deposited on a surface of the filaments, wherein the coating comprises an anode active material capable of absorbing and desorbing lithium ions and the coating has a thickness in the range of approximately 1 nm to 20 µm.

Preferably, multiple conductive filaments are processed to form an aggregate or web, characterized in that these filaments are intersected, overlapped, or somehow bonded to one another to form a network of electron-conducting paths. Preferably, this conductive network of filaments is formed before a thin coating of an anode active material, such as Si, Ge, Sn, and $SiO_2$, is applied onto the exterior surface of the filaments. The aggregate or web has substantially interconnected pores that are intended for accommodating the electrolyte in a battery.

The thin coating, with a thickness less than 20 µm (preferably less than 1 µm), is deposited on a surface of a nano-scaled substrate filament, preferably covering a majority of the exterior surface of the filament. The substrate filament may be selected from, as examples, a carbon nano fiber (CNF), graphite nano fiber (GNF), carbon nano-tube (CNT), metal nano wire (MNW), nano-scaled graphene platelet (NGP), or a combination thereof.

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 µm and 10 µm, but could be longer or shorter. The NGPs, just like other elongate bodies (carbon nano tubes, carbon nano fibers, metal nano wires, etc.), readily overlap one another to form a myriad of electron transport paths for improving the electrical conductivity of the anode. Hence, the electrons generated by the anode active material coating during Li insertion can be readily collected.

The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10 (typically much higher than 100). In the case of an NGP, the platelet has a length, a width, and a thickness, wherein the length-to-width ratio is at least 3.

The anode active material coating in the present invention can be selected from the following groups of materials:
(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 µm, more preferably thinner than 1 µm, and most preferably thinner than 100 nm;
(b) The alloys or intermetallic compounds of Si, Ge, Sn, Pb, Sb, Bi, Zn, Al, or Cd, stoichiometric or non-stoichiometric with other elements; and
(c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

The electrochemically active materials listed in (a)-(c) above, when used alone as an anode active material in a particulate or thin film form, have been commonly found to suffer from the fragmentation problem and poor cycling stability. When coated on the exterior surface of multiple conductive filaments to form a hybrid, nano filament web, the resulting anode exhibits a reversible capacity much higher than that of graphite (372 mAh/g), a low irreversible capacity loss, low internal resistance, and fast charge-recharge rates.

Another preferred embodiment of the present invention is a lithium secondary battery comprising a positive electrode, a negative electrode, and a non-aqueous electrolyte disposed between the negative electrode and the positive electrode. The anode (negative electrode) comprises a hybrid composition composed of an electrochemically active material coated on interconnected conductive filaments.

The presently invented anode material technology has several major advantages, summarized as follows:

(1) During lithium insertion and extraction, the coating layer expands and shrinks. The geometry of the underlying filament (e.g., CNF, CNT, and metal nanowire being elongate in shape with a nano-scaled diameter while NGP being a thin sheet with a nano-scaled thickness) enables the supported coating to freely undergo strain relaxation in transverse directions. The filaments selected in the present invention appear to be chemically and thermo-mechanically compatible with the anode active material coating, to the extent that the coating does not loss contact with its underlying substrate filament upon repeated charge/discharge cycles. It seems that the aggregate or web of filaments, being mechanically strong and tough, are capable of accommodating or cushioning the strains or stresses imposed on the filaments without fracturing.

(2) With the active material coating thickness less than 1 μm (most preferably less than 100 nm), the distance that lithium ions have to travel is short. The anode can quickly store or release lithium and thus can carry high currents. This is a highly beneficial feature for a battery that is intended for high power density applications such as electric cars.

(3) The interconnected network of filaments (schematically shown in FIG. 1(B)) forms a continuous path for electrons, resulting in significantly reduced internal energy loss or internal heating. The electrons produced by the anode active material coated on the exterior surface of a filament (with a radius r) only have to travel along a radial direction to a short distance t (which is the thickness of the coating, typically <1 μm) through a large cross-sectional area A, which is equivalent to the total exterior surface of a filament (A=2[r+t]L). Here, L is the length of the coating in the filament longitudinal axis direction. This implies a low resistance according to the well-known relation between the resistance $R_1$ of a physical object and the intrinsic resistivity ρ of the material making up the object: $R_1=\rho(t/A)=\rho t/(2\pi[r+t]L)=(3\ \Omega cm\times 100\ nm)/(6.28\times 150\ nm\times 10\times 10^{-4}\ cm)=3.2\times 10^2\Omega$. In this calculation we have assumed r=50 nm, t=100 nm, and L=10 μm. Once the electrons move from the outer coating into the underlying filament, which is highly conductive, they will rapidly travel down the filament longitudinal axis (of length L') and be collected by a current collector, which is made to be in good electronic contact with the web or individual filaments (ρf=$10^{-4}$ Ωcm, a typical value for NGPs and graphitized CNFs). The resistance along this highly conductive filament (average travel distance=½L') is very low, $R_2=½\rho'(L'/A'')=½\ 10^{-4}$ Ωcm×10×$10^{-4}$ cm/[0.785×$10^{-10}$ cm$^2$]=6.37×$10^2\Omega$. The total resistance=$R_1+R_2=9.57\times 10^2\Omega$.

This is in sharp contrast to the situation as proposed by Chan, et al [Ref. 26], where multiple Si nanowires were catalytically grown from a current collector surface in a substantially perpendicular direction, as schematically shown in FIG. 1(A). The electrons produced by the Si nanowires (diameter=89 nm) must travel through a narrow cross-sectional area A' of a nanowire of length l. The resistance to electron transport along the nanowire is given approximately by R=ρ(½l/AA), with an average travel distance of half of the nanowire length (hence the factor, ½). Based on the data provided by Chan, et al., ρ=3 Ωcm (after first cycle), A'=($\pi d^2/4$)=19.8×$10^{-12}$ cm$^2$, and l=10 μm, we have R=½×3 Ωcm×10×$10^{-4}$ cm/(19.8×$10^{-12}$ cm$^2$)=7.5×$10^7\Omega$, which is almost 5 orders of magnitude higher than that of a coated filament.

(4) In the nanowire technology of Chan, et al., each Si nanowire is only connected to a current collector through a very narrow contact area (diameter=89 nm) and, hence, the nanowire would tend to detach from the steel current collector after a few volume expansion-contraction cycles. Furthermore, if fragmentation of a nanowire occurs, only the segment in direct contact with the steel plate could remain in electronic connection with the current collector and all other segments will become ineffective since the electrons generated will not be utilized. In contrast, in the instant invention, the coating is wrapped around a filament and, even if the coating is fractured into separate segments, individual segments would remain in physical contact with the underlying filament, which is essentially part of the current collector. The electrons generated can still be collected.

(5) The anode material in the present invention provides a specific capacity that can be as high as 4,200 mAh/g (based on per gram of Si alone). Even when the weight of the filaments is also accounted for, the maximum capacity can still be exceptionally high. For instance, in the case of a filament with a diameter of 30 nm, (radius of 15 nm), a Si coating with a thickness of 10 nm, 20 nm, 30 nm, 50 nm, and 100 nm would imply a coating weight fraction of 67.4%, 83.8%, 90.3%, 95.4%, and 98.5%, respectively (assuming a Si coating density of 2.33 g/cm$^3$ and carbon filament density of 2.0 g/cm$^3$). This implies that the underlying filament only occupies a very small weight fraction of the total hybrid nano material. Using 95.4% as an example, the specific capacity can still be as high 4,137 mAh/g (based on per gram of the coated filament). In actuality, most of our Si-based hybrid nano filament anode exhibits a reversible specific capacity in the range of 3,000-4,000 mAh/g. This is still 8-10 times higher than the theoretical specific capacity of 372 mAh/g for the graphite anode material. Furthermore, the Li ion batteries featuring the presently invented coated filament-based nano hybrid anode material exhibit superior multiple-cycle behaviors with a small capacity fade and a long cycle life.

These and other advantages and features of the present invention will become more transparent with the description of the following best mode practice and illustrative examples.

BRIEF DESCRIPTION OF THE DRAWINGS

FIG. 6(A) Scanning electron micrographs (SEM) of electro-spun PI fibers (PI-0, before carbonization) and (B) c-PI-0 (PI fibers after carbonization).

FIG. 7 Scanning electron micrographs (SEM) of c-PAN-5 (A) before and (B) after coating.

FIG. 10 Specific capacities of Si dip-coated Sample c-PAN-0 (carbonized, electro-spun PAN fibrils) plotted as a function of the number of charge and discharge cycles.

DETAILED DESCRIPTION OF PREFERRED EMBODIMENTS

This invention is related to anode materials for high-capacity lithium secondary batteries, which are preferably secondary batteries based on a non-aqueous electrolyte or a polymer gel electrolyte. The shape of a lithium secondary battery can be cylindrical, square, button-like, etc. The present invention is not limited to any battery shape or configuration.

Figure 1A:
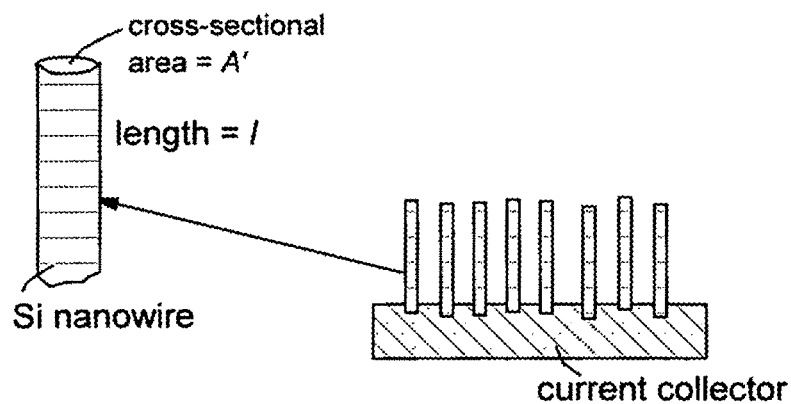
FIG. 1(A) Schematic of a prior art anode composition composed of Si nanowires catalytically grown in a direction normal to a steel current collector according to Chan, et al. [Ref. 26]; (B) Schematic of a web bonded to a current collector, wherein the web comprises networks of interconnected or intersected filaments with an anode active material coated thereon.
Figure 1B:
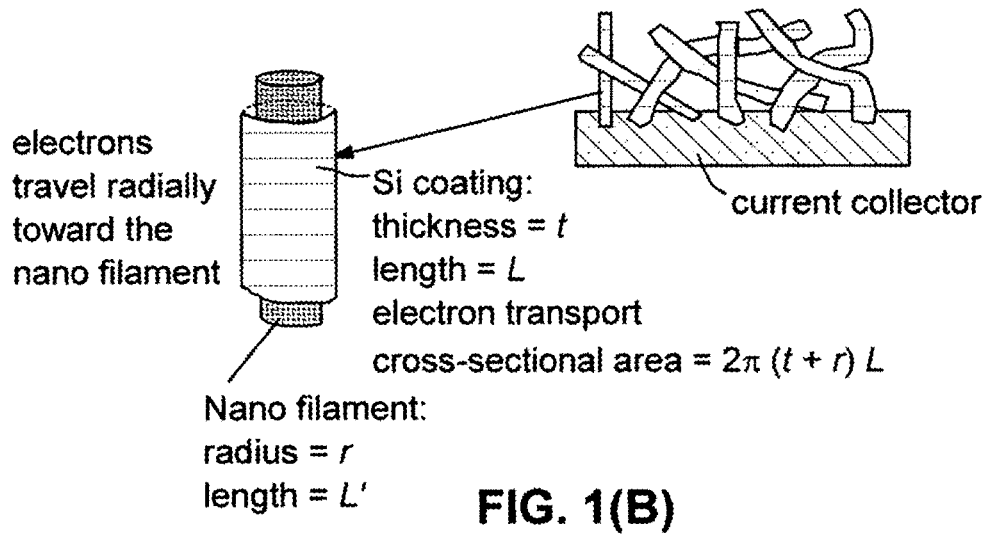
Figure 2:
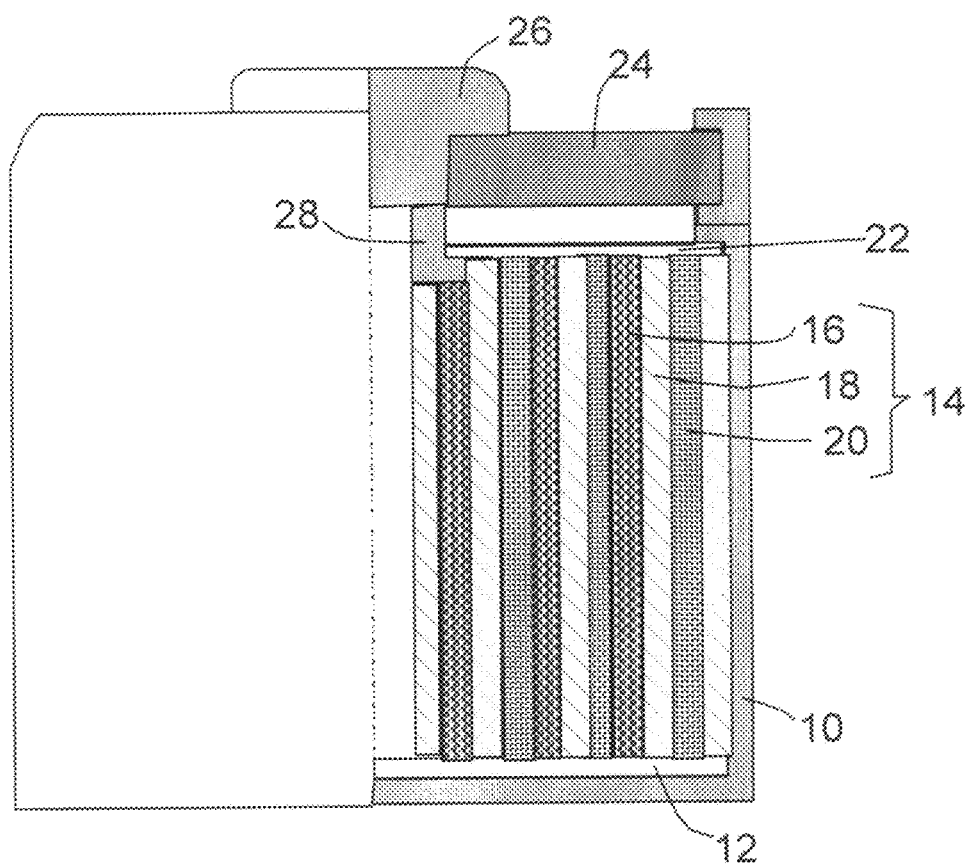
FIG. 2 Schematic of a cylinder-shape lithium ion battery.

As an example, a cylindrical battery configuration is shown in FIG. 2. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

The positive electrode (cathode) active materials are well-known in the art. The positive electrode 16 can be manufactured by the steps of (a) mixing a positive electrode active material with a conductor agent (conductivity-promoting ingredient) and a binder, (b) dispersing the resultant mixture in a suitable solvent, (c) coating the resulting suspension on a collector, and (d) removing the solvent from the suspension to form a thin plate-like electrode. The positive electrode active material may be selected from a wide variety of oxides, such as manganese dioxide, lithium/manganese composite oxide, lithium-containing nickel oxide, lithium-containing cobalt oxide, lithium-containing nickel cobalt oxide, lithium-containing iron oxide and lithium-containing vanadium oxide. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium vanadium phosphate because these oxides provide a high cell voltage and good cycling stability.

Acetylene black, carbon black, or ultra-fine graphite particles may be used as a conductor agent. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 80 to 95% by weight for the positive electrode active material, 3 to 20% by weight for the conductor agent, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

The negative electrode (anode), which the instant invention provides, is now explained in detail as follows: The material composition comprises (a) an aggregate of nanometer-scaled, electrically conductive filaments that are substantially interconnected, intersected, or percolated to form a porous, electrically conductive filament network, wherein the filament network comprises substantially interconnected pores and the filaments have an elongate dimension and a first transverse dimension with the first transverse dimension being less than 500 nm (preferably less than 100 nm) and an elongate dimension-to-first transverse dimension aspect ratio being greater than 10; and (b) micron- or nanometer-scaled coating that is deposited on a surface of the filaments, wherein the coating comprises an anode active material capable of absorbing and desorbing lithium ions and the coating has a thickness less than 20 μm, preferably thinner than 1 μm.

Preferably, multiple conductive filaments are processed to form an aggregate or web, characterized in that these filaments are intersected, overlapped, or somehow bonded to one another to form a network of electron-conducting paths. Although not a necessary condition, a binder material may be used to bond the filaments together to produce an integral web. The binder material may be a non-conductive material, such as polyvinylidene fluoride (PVDF) and poly(tetrafluoroethylene) (PTFE). However, an electrically conductive binder material is preferred, which can be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline). Preferably, this conductive network of filaments is formed before a thin coating of an anode active material, such as Si, Ge, Sn, and $SiO_2$, is applied onto the exterior surface of the filaments. The aggregate or web has substantially interconnected pores that are intended for accommodating the electrolyte in a battery.

The thin coating, with a thickness less than 20 μm (preferably less than 1 μm and most preferably less than 100 nm), preferably is deposited on a majority of the exterior surface of a nano-scaled filament substrate. The filament may be selected from, as examples, a carbon nano fiber (CNF), graphite carbon fiber (GNF), carbon nano-tube (CNT), metal nano wire (MNW), metal-coated nano fiber, nano-scaled graphene platelet (NGP), or a combination thereof. The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10. In the case of an NGP, the platelet has a length, a width, and a thickness, wherein the length-to-width ratio is preferably at least 3.

The most important property of a filament herein used to support a coating is a high electrical conductivity to enable facile collection of electrons produced by the anode active material (e.g., Si coated on a CNF) with minimal resistance. A low conductivity implies a high resistance and high energy loss, which is undesirable. The filament should also be chemically and thermo-mechanically compatible with the intended coating material to ensure a good contact between the filament and the coating upon repeated charging/discharging and heating/cooling cycles. As an example, a Si-based coating can undergo a volume expansion up to a factor of 4 (400%) when Si absorbs Li ions to its maximum capacity (e.g., as represented by $Li_{4.1}Si$). By contrast, conventional non-carbon based anode active materials in a powder or thin-film form (e.g., Si powder and $SiO_2$ film) have a great propensity to get fragmented, losing contact with the current collector.

In the present application, nano-wires primarily refer to elongate solid core structures with diameters below approximately 100 nm and nanotubes generally refer to elongate, single or multi-walled hollow core structures with diameters below approximately 100 nm. Whiskers are elongate solid core structures typically with a diameter greater than 100 nm. However, carbon nano tubes (CNTs) specifically refer to hollow-core structures with a diameter smaller than 10 nm. Both hollow-cored and solid-cored carbon- or graphite-based filaments with a diameter greater than 10 nm are referred to as carbon nano fibers (CNFs) or graphite nano fibers (GNFs), respectively. Graphite nano fibers are typically obtained from carbon nano fibers through a heat treatment (graphitization) at a temperature greater than 2,000° C., more typically greater than 2,500° C.

Catalytic growth is a powerful tool to form a variety of wire or whisker-like structures with diameters ranging from just a few nanometers to the micrometer range. A range of phases (gas, solid, liquid, solution, and supercritical fluid) have been used for the feeder phase, i.e. the source of material to be incorporated into the nano-wire. The history of catalytic growth of solid structures is generally believed to begin with the discovery of Wagner and Ellis [Ref. 19] that Si whiskers could be grown by heating a Si substrate in a mixture of $SiCl_4$ and $H_2$ with their diameters determined by the size of Au particles that had been placed on the surface prior to growth.

A range of metal catalysts have been shown to work for the synthesis of carbon nano fibers and CNTs [Ref. 20]. Takagi et al. [Ref. 21] have shown that pyrolysis of ethanol can be used in the presence of Fe, Co or Ni (the most common catalysts), Pt, Pd, Cu, Ag, or Au for the growth of single-walled carbon nanotubes (SW-CNT). For the latter three metals to work, not only do they have to be clean to start with, they must also be smaller than 5 nm in diameter for growth to be efficient. They propose that the essential role of metal particles is to provide a platform on which carbon atoms can form a hemispherical cap from which SW-CNT grow in a self-assembled fashion. Both CNTs and vapor-grown CNFs are now commercially available, but at an extremely high cost.

The art of catalytic synthesis of semiconductor or insulator-type nano wires from a wide range of material systems have been reviewed by Kolasinski [Ref. 22] and by Wang, et al. [Ref. 23]. These material systems include branched Si nanowires (SiNW), heterojunctions between SiNW and CNT, $SiO_x$ (a sub-stoichiometric silicon oxide), $SiO_2$, $Si_{1-x}Ge_x$, Ge, AlN, γ-$Al_2O_3$, oxide-coated B, $CN_x$, CdO, CdS, CdSe, CdTe, α-$Fe_2O_3$ (hematite), ε-$Fe_2O_3$ and $Fe_3O_4$ (magnetite), GaAs, GaN, $Ga_2O_3$, GaP, InAs, InN (hexagonal structures), InP, $In_2O_3$, $In_2Se_3$, LiF, $SnO_2$, ZnO, ZnS, ZnSe, Mn doped $Zn_2SO_4$, and ZnTe.

Metal nano wires can be produced using solution phase reduction, template synthesis, physical vapor deposition, electron beam lithography, and electrodeposition, as reviewed by Walter, et al. [Ref. 24]. Kogiso, et al. [Ref. 25] proposed a method of producing metal nano wires that included reducing a nano fiber comprising a metal complex peptide lipid.

The nano-scaled graphene platelets (NGPs) may be obtained from intercalation, exfoliation, and separation of graphene sheets in a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or polymeric carbon. For instance, natural graphite may be subjected to an intercalation/oxidation treatment under a condition comparable to what has been commonly employed to prepare the so-called expandable graphite or stable graphite intercalation compound (GIC). This can be accomplished, for instance, by immersing graphite powder in a solution of sulfuric acid, nitric acid, and potassium permanganate for preferably 2-24 hours (details to be described later). The subsequently dried product, a GIC, is then subjected to a thermal shock (e.g., 1,000° C. for 15-30 seconds) to obtain exfoliated graphite worms, which are networks of interconnected exfoliated graphite flakes with each flake comprising one or a multiplicity of graphene sheets. The exfoliated graphite is then subjected to mechanical shearing (e.g., using an air milling, ball milling, or ultrasonication treatment) to break up the exfoliated graphite flakes and separate the graphene sheets {Refs. 27-32]. The platelet surfaces can be readily deposited with a coating of the active material. We have found that intercalation and exfoliation of graphite fibers result in the formation of NGPs with a high length-to-width ratio (typically much greater than 3). The length-to-thickness ratio is typically much greater than 100.

Another particularly preferred class of electrically conductive filaments includes nano fibers obtained via electrospinning of polymer-containing fluids [Refs. 33-35] or pitch. The main advantage of electro-spinning is the ability to produce ultra-fine fibers ranging from nanometer to submicron in diameter. The electro-spinning process is fast, simple, and relatively inexpensive. The process can be used to form fibers from a wide range of polymer liquids in solution or melt form. The polymer may contain a desired amount of conductive additives to make the spun fibers electrically conductive. Because of the extremely small diameters and excellent uniformity of electrostatically spun fibers, high-quality non-woven fabrics or webs having desirable porosity characteristics can be readily produced by this technique. Many electro-spun polymer fibers can be subsequently heat-treated or carbonized to obtain carbon nano fibers. For instance, polyacrylonitrile (PAN), copolymers of pyromellitic dianhydride (PMDA) and 4,4'-oxydianiline (ODA), and CNT- or NGP-containing PAN can be made into a solution, which is then electro-spun into nanometer fibers. The fibers can be successfully carbonized at 1000° C. to produce carbon fiber webs with a tensile strength of 5.0 MPa (or much higher if containing CNTs or NGPs) and an electrical conductivity of >2.5 S/cm. The electrical conductivity can be increased by up to 4 orders of magnitude if the carbonized fiber is further graphitized at a temperature higher than 2,500° C.

The polymer nano fibers can be electrically conductive if the precursor polymer is intrinsically conductive (e.g., conjugate chain polymers such as polyaniline, PANi). Conductive fillers, such as carbon black, nano metal particles, CNTs, and NGPs, may be added to the polymer solution prior to electro-spinning. The resulting electro-spun fibers will be electrically conductive. A polymer fiber may become surface-conductive if the fiber surface is deposited with a conductive material, such as copper or conductive polymer. In addition, carbonization and optional graphitization of a polymer fiber can significantly increase the electrical conductivity. A major advantage of electro-spun and carbonized nano fibers is its low cost, which can be an order of magnitude less expensive than vapor-grown CNFs and two orders of magnitude less expensive than CNTs.

Figure 3:
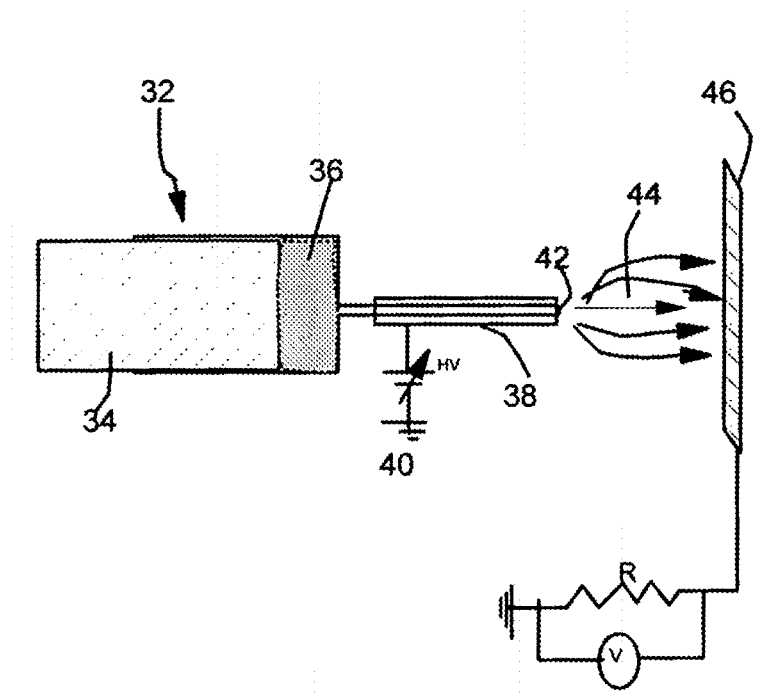
FIG. 3 Schematic of an electro-spinning apparatus.

For illustration purposes, electro-spinning of a polymer or a polymer containing a conductive additive (e.g., NGPs or carbon black) is herein described. As schematically shown in FIG. 3, the process begins with the preparation of a polymer solution and, if NGPs are needed, dispersion of NGPs in a polymer-solvent solution to prepare a suspension solution, which is contained in a chamber 36 of a syringe-type configuration 32. The syringe may be connected to a metering pump or simply contains a drive cylinder 34, which can be part of a metering device. A metal-coated syringe needle 38 serves as an electrode, which is connected to a high-voltage power supply 40. When a proper voltage is applied, charges begin to build up in the suspension. At a critical charge level, repulsive forces overcome the surface tension of the suspension, ejecting streams of fluid out of an orifice 42. The streams of suspension, in the form of thin, elongated fibrils 44, move toward a collector screen 46 while the solvent vaporizes, leaving behind dried fibrils that are collected on the screen, which may be electrically grounded or at a potential different than the potential at the needle electrode 48. The collector screen 46 serves to collect the nanocomposite fibrils produced. Electro-spinning apparatus are well-known in the art.

In a best mode of practice for producing electro-spun NGP-containing polymer nano fibers, the preparation of a suspension solution for electro-spinning is accomplished by first preparing two solutions (A=solvent+NGPs and B=solvent+polymer) and then mixing the two solutions together to obtain the suspension solution. The NGPs may be added to a solvent with the resulting suspension being subjected to a sonication treatment to promote dispersion of separate NGPs in the solvent. This fluid is a solvent for the polymer, not for the NGPs. For NGPs, this fluid serves as a dispersing medium only. The resulting suspension solution is hereinafter referred to as Suspension A. Suspension solution B is obtained by dissolving the polymer in the solvent with the assistance of heat and stirring action. Suspensions A and B are then mixed together and, optionally, sonicated further to help maintain a good dispersion of NGPs in the polymer-solvent solution.

With a syringe needle nozzle tip of approximately 2-5 μm, the resulting nanocomposite fibrils have a diameter typically smaller than 300 nm and more typically smaller than 100 nm. In many cases, fibrils as small as 20-30 nm in diameter can be easily obtained. It is of great interest to note that, contrary to what would be expected by those skilled in the art, the NGP loading in the resulting nanocomposite fibrils could easily exceed 15% by weight. This has been elegantly accomplished by preparing the suspension solution that contains an NGP-to-polymer weight ratio of 0.15/0.85 with the ratio of (NGP+polymer) to solvent being sufficiently low to effect ejection of the suspension into fine streams of fluid due to properly controlled suspension solution viscosity and surface tension. Typically, the (NGP+polymer)-to-solvent ratio is between 1/5 and 1/10. The excess amount of solvent or dispersion agent was used to properly control the fluid properties as required. The solvent or dispersing agent can be quickly removed to produce dried nanocomposite fibrils with the desired NGP loading. The NGPs have a thickness preferably smaller than 10 nm and most preferably smaller than 1 nm. Preferably, the NGPs have a width or length dimension smaller than 100 nm and further preferably smaller than 30 nm. These NGP dimensions appear to be particularly conducive to the formation of ultra-fine diameter nanocomposite fibrils containing a large loading of NGPs.

Preferred matrix polymers are polyacrylonitrile (PAN) and a mixture of polyaniline (PANi) and polyethylene oxide (PEO). PAN fibrils obtained by electro-spinning can be readily converted into carbon nano fibers by heating the fibrils at a temperature of 150° C. to 300° C. in an oxidizing environment and then carbonizing the oxidized fibers at a temperature of 350° C. to 1,500° C. If further heat-treated at a temperature of 2,000° C. and 3,000° C., the carbon nano fibers become graphite nano fibers. The fibrils of the (PANi+PEO) mixture are intrinsically conductive and do not require any carbonization treatment. Electro-spinning also enables fibrils to intersect and naturally bond to one another for forming a web that has a desired network of conductive filaments.

The active material coating is bonded or attached to the surfaces of filaments. The filaments form a network of electron transport paths for dramatically improved electrical conductivity or reduced internal resistance (hence, reduced energy loss and internal heat build-up). It appears that the mechanical flexibility and strength of the conductive filaments selected in the present study enables the coating to undergo strain relaxation quite freely in the radial directions during the charge-discharge cycling of the lithium ion battery. Consequently, the coating appears to remain in a good contact with the underlying filaments. Due to adequate strength and toughness, the filaments remain essentially intact when the coating undergoes expansion or contraction. No significant fragmentation of the coating was observed in all of the hybrid nano materials investigated. Even if the coating were to get fractured into several segments, individual segments are still wrapped around a conductive filament and would not lose their electrical connection the anode current collector.

Figure 4:
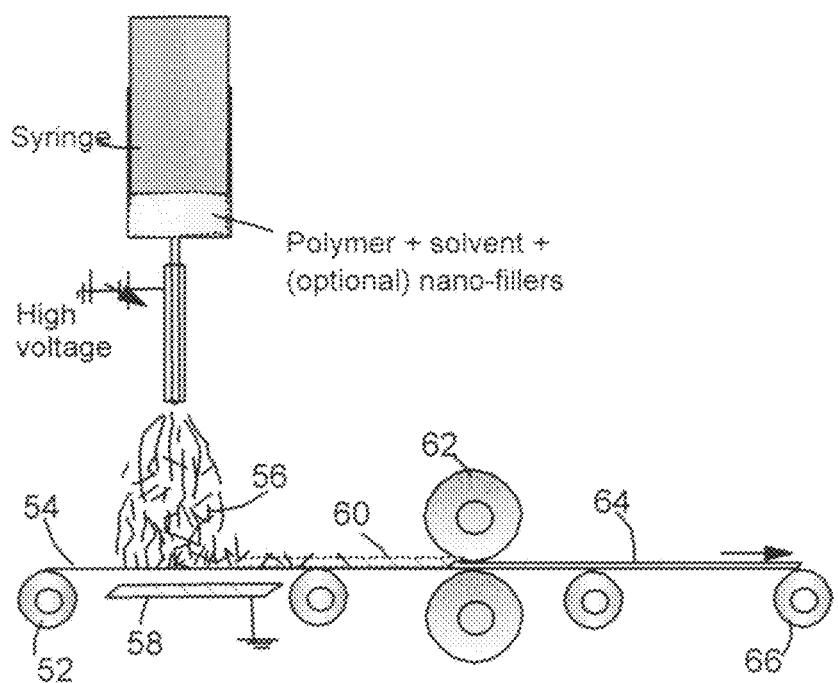
FIG. 4 Schematic of a roll-to-roll apparatus for producing a roll of mats or webs from electro-spun fibers.

Multiple filaments can be easily combined to form an aggregate, such as in a mat, web, non-woven, or paper form. In the case of electro-spun fibrils, the fibrils may naturally overlap one another to form an aggregate upon solvent removal. Schematically shown in FIG. 4 is an innovative roll-to-roll process for continuously producing rolls of electro-spun nano fibril-based porous thin film, paper, mat, or web. The process begins with reeling a porous substrate 54 from a feeder roller 52. The porous substrate 54 is used to capture the electro-spun nano fibrils 56 that would otherwise be collected by a stationary collector 58 (disposed immediately below the moving substrate), which is now just a counter electrode for the electro-spinning apparatus disposed above the moving substrate. The collected fibril mat 60 may be slightly compressed by a pair of rollers 62. The rollers may be optionally heated to melt out the polymer surface in the nano fibrils to consolidate the mat 64 into an integral web. The web, paper, or mat may be continuously wound around a take-up roller 66 for later uses.

Several techniques can be employed to fabricate a conductive aggregate of filaments (a web or mat), which is a monolithic body having desired interconnected pores. In one preferred embodiment of the present invention, the porous web can be made by using a slurry molding or a filament/binder spraying technique. These methods can be carried out in the following ways:

As a wet process, an aqueous slurry is prepared which comprises a mixture of filaments and, optionally, about 0.1 wt % to about 10 wt % resin powder binder (e.g., phenolic resin). The slurry is then directed to impinge upon a sieve or screen, allowing water to permeate through, leaving behind filaments and the binder. As a dry process, the directed fiber spray-up process utilizes an air-assisted filament/binder spraying gun, which conveys filaments and an optional binder to a molding tool (e.g., a perforated metal screen shaped identical or similar to the part to be molded). Air goes through perforations, but the solid components stay on the molding tool surface.

Figure 5:
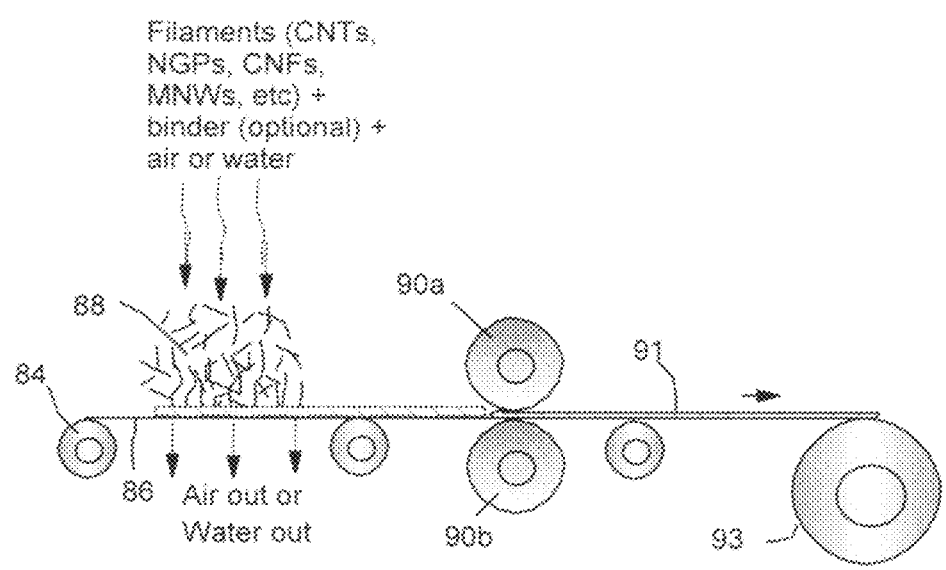
FIG. 5 Schematic of a roll-to-roll apparatus for producing a roll of mats or webs from various conductive filaments.

Each of these routes can be implemented as a continuous process. For instance, as schematically shown in FIG. 5, the process begins with pulling a substrate 86 (porous sheet) from a roller 84. The moving substrate receives a stream of slurry 88 (as described in the above-described slurry molding route) from above the substrate. Water sieves through the porous substrate with all other ingredients (a mixture of filaments and a binder) remaining on the surface of the substrate being moved forward to go through a compaction stage by a pair of compaction rollers 90a, 90b. Heat may be supplied to the mixture before, during, and after compaction to help cure the thermoset binder for retaining the shape of the resulting web or mat. The web or mat 91, with all ingredients held in place by the thermoset binder, may be stored first (e.g., wrapped around a roller 93).

Similar procedures may be followed for the case where the mixture 88 of filaments and the binder is delivered to the surface of a moving substrate 86 by compressed air, like in a directed fiber/binder spraying route described above. Air will permeate through the porous substrate with other solid ingredients trapped on the surface of the substrate, which are conveyed forward. The subsequent operations are similar than those involved in the slurry molding route.

In yet another preferred embodiment, the web may be made from nano filaments (such as NGPs, GNFs, CNTs, and metal nano wires) using a conventional paper-making process, which is well-known in the art.

The anode active material for use as a coating in the present invention is preferably selected from the following groups of materials:

(1) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form deposited on the exterior surface of the supporting filaments. The coating is preferably thinner than 10 μm, more preferably thinner than 1 μm, and most preferably thinner than 100 nm. This group of material was chosen for our studies due to the notion that their theoretical capacity is significantly higher than that of graphite alone: $Li_{4.4}Si$ (3,829-4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

(2) The alloys or intermetallic compounds of Si, Ge, Sn, Pb, Sb, Bi, Zn, Al, or Cd, stoichiometric or non-stoichiometric, with other elements; and (3) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd. For instance, composite oxides may be prepared by co-vaporizing two metal elements (e.g., Sn and B), which are then allowed to react with oxygen at a desired elevated temperature. (e.g., to produce a mixture of SnO and $B_2O_3$). SnO or $SnO_2$ alone is of particular interest due to their high theoretical capacities. Iron oxide is of interest since $Li_6Fe_2O_3$ has a theoretical capacity of 1,000 mAh/g. The capacity of $SnS_2$ coating, which can be obtained by atomization of Sn or vaporization of Sn and reaction of Sn with sulfur vapor, is as high as 620 mAh/g and is stable under charge-discharge cycling conditions.

A wide range of processes can be used to deposit a thin coating of any of the aforementioned materials, including, but not limited to, physical vapor deposition (PVD), plasma-enhanced PVD, chemical vapor deposition (CVD), plasma-enhanced CVD, hot wire CVD, vacuum plasma spraying, air plasma spraying, sputtering, reactive sputtering, dip-coating, electron beam induced deposition, laser beam induced deposition, atomization, and combined atomization/reaction.

The electrochemically active coating of an anode material according to a preferred embodiment of the invention include at least one of silicon (Si), germanium (Ge), and tin (Sn) as an element. This is because silicon, germanium, and tin have a high capability of inserting and extracting lithium, and can reach a high energy density. The next preferred group of elements includes lead (Pb), antimony (Sb), bismuth (Bi), zinc (Zn), aluminum (Al), and cadmium (Cd). When any of these two sets of elements are included as a primary element of an electrochemically active material (defined as being capable of absorbing and extracting lithium ions in the present context), which is deposited on filaments, the cycling stability of the resulting anode material can be significantly improved.

In general, the active material may include only one kind or a mixture of a plurality of kinds selected from the group consisting of Si, Ge, Sn, Pb, Sb, Bi, Zn, Al, and Cd. In the invention, the alloy or compound may include one or more kinds of metal elements from this group and one or more kinds of metal elements from other groups. Further, the alloy or compound may include a non-metal element. The active alloy or compound material may be a solid solution, a eutectic (eutectic mixture), an intermetallic compound (stoichiometric or non-stoichiometric), or the coexistence of two or more kinds selected from them. Preferably, the material comprises a nanocrystalline or amorphous phase.

As an alloy or compound of silicon, for example, an active material may include at least one element selected from the group consisting of tin (Sn), nickel (Ni), copper (Cu), iron (Fe), cobalt (Co), manganese (Mn), zinc (Zn), indium (In), silver (Ag), titanium, germanium (Ge), bismuth (Bi), antimony (Sb) and chromium (Cr) as a second element in addition to silicon. As an alloy or compound of tin, for example, an active material may include at least one kind selected from the group consisting of silicon, nickel, copper, iron, cobalt, manganese, zinc, indium, silver, titanium, germanium, bismuth, antimony and chromium as a second element in addition to tin.

As a compound of silicon or a compound of tin, for example, a compound including oxygen (O), carbon (C), nitrogen (N), sulfur (S), or phosphorous (P) may be used, and the compound may include the above-described second element in addition to tin or silicon. A preferred example is a SnCoC-containing material in which tin, cobalt and carbon are included as elements, and the carbon content is within a range from 9.9 wt % to 29.7 wt % inclusive, and the ratio Co/(Sn+Co) of cobalt to the total of tin and cobalt is within a range from 30 wt % to 70 wt % inclusive, because a high energy density and superior cycle characteristics can be obtained within such a composition range for an electrochemically active material coated on a conductive nano filament.

The SnCoC-containing material may further include any other element, if necessary. As the element, for example, silicon, iron, nickel, chromium, indium, niobium (Nb), germanium, titanium, molybdenum (Mo), aluminum, phosphorus (P), gallium (Ga) or bismuth is preferable, and two or more kinds selected from them may be included. This suggestion is based on the observation that the capacity and the cycle characteristics of anodes can be further improved. The SnCoC-containing material includes a phase including tin, cobalt and carbon, and the phase preferably has a nano-crystalline structure or an amorphous structure. Moreover, in the SnCoC-containing material, at least a part of carbon if added as an element, is preferably bonded to a metal element or a metal compound. This is based on the consideration that a decline in the cycle characteristics of prior art lithium ion battery is caused by cohesion or crystallization of tin or the like. When carbon is bonded to the metal or compound, such cohesion or crystallization can be inhibited. However, we have observed that, with the active material coated on the filament surface, there has been minimal or not cohesion or crystallization. Presumably, this is one of the major advantages of using conductive, carbon-based nano filaments as a substrate.

The active material in a thin film or coating form on a surface of a web of filaments may be formed through depositing the material by, for example, a liquid-phase deposition method, an electrodeposition method, a dip coating method, an evaporation method, a physical vapor deposition method, a sputtering method, a CVD (Chemical Vapor Deposition) method, or the like. The single-element coating is preferably formed by the dip-coating method among them, because the deposition of an extremely small amount of the active material (e.g., Si, Sn or Ge) can be easily controlled. The CVD or plasma-enhanced CVD method is also quite useful.

Another preferred class of electrochemically active material that can be deposited on the surface of filaments include the oxides, carbides, nitrides, sulfides, phosphides, selenides, tellurides, or their mixtures (e.g., co-oxides or composite oxides) of Si, Ge, Sn, Pb, Sb, Bi, Zn, Al, Fe, or Cd. They can be readily produced in a thin-film or coating form. For instance, Sn alone may be vaporized using an arc plasma heating technique to produce Sn vapor in a reactor and, concurrently, a stream of oxygen gas is introduced into the reactor to react with Sn vapor. The reaction product, SnO, is in nano cluster, which can be directed to deposit onto a desired substrate (e.g., a web of CNFs). Alternatively, Sn admixed with B, Al, P, Si, Ge, Ti, Mn, Fe, or Zn may be subjected to co-vaporization and an oxidative reaction to obtain composite oxides. Iron oxide is of interest since $Li_6Fe_2O_3$ has a theoretical capacity of 1,000 mAh/g. The capacity of $SnS_2$ is as high as 620 mAh/g and is stable under charge-discharge cycling conditions. $SnS_2$ Coating may be deposited onto a web of filaments by placing the web in a reaction chamber, into which are introduced two streams of reactants—a stream of Sn vapor produced by arc plasma heating and a stream of S vapor obtained by sublimation or vaporization.

Combined atomization (or vaporization) and reaction can be used to obtain the oxides, carbides, nitrides, sulfides, phosphides, selenides, tellurides, or their mixtures, as illustrated in W. C. Huang, "Method for the Production of Semiconductor Quantum Particles," U.S. Pat. No. 6,623,559 (Sep. 23, 2003) and J. H. Liu and B. Z. Jang, "Process and Apparatus for the Production of Nano-Scaled Powders," U.S. Pat. No. 6,398,125 (Jun. 4, 2002).

Alternatively, an amorphous or nanocrystalline coating may be obtained from chemical vapor deposition (CVD) of an organic precursor. CVD is accomplished by placing a substrate (e.g., a web of conductive filaments) in a reactor chamber and heating the substrate to a certain temperature. Controlled amounts of silicon or nitride source gases, usually carried by either nitrogen and/or hydrogen, are added to the reactor. Dopant gases may also be added if desired. A reaction between the source gases and the substrate occurs, thereby depositing the desired silicon, silicon oxide, or silicon nitride layer. Atmospheric CVD or low pressure CVD (LPCVD) for the deposition of Si, silicon oxide, or silicon nitride coatings, for instance, is normally conducted at a temperature of approximately 500-1,100° C. Commonly used silicon and nitride sources are silane ($SiH_4$), silicon tetrachloride ($SiCl_4$), ammonia ($NH_3$), and nitrous Oxide ($N_2O$). Dopant sources, when needed, are arsine ($AsH_3$), phosphine ($PH_3$), and diborane ($B_2H_6$). Commonly used carrier gases are nitrogen ($N_2$) and hydrogen ($H_2$). Heating sources include radio frequency (RF), infrared (IR), or thermal resistance. The following reactions and typical reaction conditions are of interest:

1. Medium temperature (600-1100° C.):
   a. Silicon Nitride ($Si_3N_4$): $3\ SiH_4 + 4\ NH_3 \rightarrow Si_3N_4 + 12H_2$ ($H_2$ carrier gas; 900-1,100° C.)
   b. Silicon (Nanocrystalline or amorphous Si): $SiH_4 + Heat \rightarrow Si + 2H_2$ ($H_2$ carrier gas; 850-1000° C.) or ($N_2$ carrier gas; 600-700° C.)
   c. Silicon Dioxide ($SiO_2$):
     1. $SiH_4 + 4\ CO_2 \rightarrow SiO_2 + 4\ CO + 2H_2O$; $N_2$ carrier gas (500-900° C.)
     2. $2H_2 + SiCl_4 + CO_2 \rightarrow SiO_2 + 4\ HCl$; $H_2$ carrier gas (800-1000° C.)
     3. $SiH_4 + CO \rightarrow SiO_2 + 2H_2$; $H_2$ Carrier gas (600-900° C.)

2. Low Temperature (<600° C.):
   a. Silicon Dioxide ($SiO_2$) or p-doped $SiO_2$
      1. $SiH_4+2O_2+Dopant \rightarrow SiO_2+2H_2O$; $N_2$ carrier gas (200-500° C.)
      2. $SiH_4+2O_2+Dopant \rightarrow SiO_2+2H_2O$; $N_2$ carrier gas (<600° C.)
      3. $SiH_4+2O_2+Dopant \rightarrow SiO_2+2H_2O$; $N_2$ carrier gas (<600° C.)
   b. Silicon Nitride ($Si_3N_4$)
      1. $3 SiH_4+4 NH_3$ (or $N_2O$)$\rightarrow Si_3N_4+12H_2$; $N_2$ carrier gas (600-700° C.)
3. Low Temperature Plasma Enhanced CVD (<600° C.) utilizing radio frequency (RF) or reactive sputtering:
   a. Silicon Dioxide ($SiO_2$): $SiH_4+2O_2 \rightarrow SiO_2+2H_2O$
   b. Silicon Nitride: $3 SiH_4+4 NH_3$ (or $N_2O$)$\rightarrow Si_3N_4+12H_2$ Similarly, coatings of amorphous germanium (Ge) and other metallic or semi-conducting elements can be produced by a variety of methods, for instance, by sputtering, vacuum evaporation, plasma deposition, and chemical vapor deposition at approximately atmospheric pressure. For instance, controllably dopable amorphous germanium can be produced by means of low pressure chemical vapor deposition at a reaction temperature between about 350° C. and about 400° C., in an atmosphere comprising a Ge-yielding precursor such as $GeI_4$, at a pressure between about 0.05 Torr and about 0.7 Torr, preferably between about 0.2 and 0.4 Torr.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. The grain sizes of the crystalline phases were determined by the Scherer equation. When the grain size was calculated to be less than 50 nanometers, the phase was considered to be nanocrystalline. In several cases, scanning electron microscopy (SEM) and transmission electron microscopy (TEM) were used to characterize the structure and morphology of the hybrid material samples.

A web of coated filaments was bonded onto a copper foil to be employed as a collector. After being dried, web-copper foil configuration was hot-pressed to obtain a negative electrode. In some cases, webs of filaments were bonded to a current collector prior to the coating procedure. An NGP-containing resin was used as the binder for this purpose. Filaments may also be bonded by an intrinsically conductive polymer. For instance, polyaniline-maleic acid-dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

Unless otherwise noted, the cathode of a lithium ion battery was prepared in the following way. First, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 μm) serving as a current collector. The resulting two-layer aluminum foil-active material configuration was then hot-pressed to obtain a positive electrode.

A positive electrode, a separator composed of a porous polyethylene film, and a negative electrode was stacked in this order. The stacked body was spirally wound with a separator layer being disposed at the outermost side to obtain an electrode assembly as schematically shown in FIG. 2. Hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent). The electrode assembly and the non-aqueous electrolyte were placed in a bottomed cylindrical case made of stainless steel, thereby obtaining a cylindrical lithium secondary battery.

The following examples are presented primarily for the purpose of illustrating the best mode practice of the present invention, not to be construed as limiting the scope of the present invention.

Example 1

Conductive Web of Filaments from Electro-Spun PAA Fibrils

Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus schematically shown in FIG. 3. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain Sample c-PI-0 with an average fibril diameter of 67 nm.

Example 2

Conductive Web of Filaments from Electro-Spun PAN Fibrils and NGP-Containing PAN Fibrils Suspension solutions were obtained by first preparing two solutions (A=solvent+NGPs and B=solvent+polymer) and then mixing the two solutions together to obtain the suspension solution. In the case of NGP-PAN fibril, the solvent used was N,N,-dimethyl formamide (DMF). For the preparation of Suspension A, the NGPs were added to a solvent and the resulting suspensions were sonicated to promote dispersion of separate NGPs in the solvent with a sonication time of 20 minutes. Suspension solution B was obtained by dissolving the polymer in the solvent with the assistance of heat (80° C. for DMF+PAN) and stirring action using a magnetic stirrer typically for 90 and 30 minutes, respectively. Suspensions A and B were then mixed together and further sonicated for 20 minutes to help maintain a good dispersion of NGPs in the polymer-solvent solution. An electrostatic potential of 10 kV was applied over a distance of 10 cm between the syringe needle tip and a 10 cm×10 cm porous aluminum plate that was grounded.

A range of NGP-polymer proportions in the original suspension solution were prepared (based on (NGP wt.)/(NGP wt.+polymer weight)): 0%, 5%, and 10% for PAN compositions. The resulting nanocomposite fibrils, after the solvent was completely removed, had comparable NGP-polymer ratios as the original ratios. They are designated as Samples PAN-0, PAN-5, and PAN-10, respectively. The average diameter of these fibrils were approximately 75 nm.

The NGP-PAN nanocomposite fibrils were converted to carbon/carbon nanocomposite by heat-treating the fibrils first at 200° C. in an oxidizing environment (laboratory air) for 45 minutes and then at 1,000° C. in an inert atmosphere for 2 hours. The resulting carbonized samples are referred to as Samples c-PAN-5 and c-PAN-10, respectively. NGP-free PAN fibrils were also carbonized under comparable conditions to obtain Sample c-PAN-0. Their diameters became approximately 55 nm.

Example 3

Preparation of NGP-Based Webs (Aggregates of NGPs and NGPs+CNFs)

Continuous graphite fiber yarns (Magnamite AS-4 from Hercules) were heated at 800° C. in a nitrogen atmosphere for 5 hours to remove the surface sizing. The yarns were cut into segments of 5 mm long and then ball-milled for 24 hours. The intercalation chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite fibers (20 g) were added under vigorous stirring to avoid agglomeration. After the graphite fiber segments were well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite fiber sample. The dried, expandable graphite fiber sample was quickly placed in a tube furnace preheated to 1,000° C. and allowed to stay inside a quartz tube for approximately 40 seconds to obtain exfoliated graphite worms. The worms were dispersed in water to form a suspension, which was ultrasonicated with a power of 60 watts for 15 minutes to obtain separated NGPs. Approximately half of the NGP-containing suspension was filtered and dried to obtain several paper-like mats, referred to as Sample NGP-100. Vapor grown CNFs were then added to the remaining half to form a suspension containing both NGPs and CNFs (20%), which was dried and made into several paper-like mats (Sample NGP-CNF-20). Approximately 5% phenolic resin binder was used to help consolidate the web structures in both samples.

Example 4

Preparation of Conductive Webs from CNTs and Vapor-Grown CNFs

Commercially available CNTs (Southwest Nano) and vapor-grown CNFs (Applied Science, Inc., Cedarville, Ohio) were separately made into conductive webs using a conventional paper-making procedure. Basically, a slurry of CNTs or CNFs was poured over a top surface of a Teflon-based membrane with sub-micron pores. Water permeates through the membrane pores with the assistance of a suction force created by a vacuum pump-generated pressure differential between the top surface and the bottom surface of the membrane. Solid ingredients (CNTs or CNFs) stay on the top surface of the membrane, which may be separated from the membrane and dried to become a sheet of porous paper or mat (Sample CNT and Sample CNF).

Example 5

Dip-Coating of Webs in Si Melt

A particularly simple and effective coating process is dip coating of a substrate in a molten metal. Specifically, a useful web coating process in practicing the present invention was adapted from that of Heaps, et al., "Method for dip-coating ceramic with molten silicon," U.S. Pat. No. 4,112,135 (Sep. 5, 1978). Heaps, et al., observed that many ceramics (e.g., mullite, alumina and zirconia), when brought into contact with molten silicon, were not wet by the silicon and no coating took place. They overcame this problem by first carbonizing the surface of such a substrate and then contacting the carbonized surface of the ceramic with the molten silicon, whereupon a large-grain silicon coating was produced wherever the ceramic was carbonized. In this way the ceramic of the type which was not wet by molten silicon could be successfully coated with silicon. After extensive work, we found that molten silicon was capable of wetting all the carbon-based filaments, including NGPs, CNTs, and CNFs (either vapor-grown or electro-spun and carbonized, with or without subsequent graphitization). In a laboratory procedure, one could just quickly dip a piece of the conductive web into and out of a bath of molten Si in a non-oxidizing or protective (helium) gas atmosphere. The coating thickness was determined by how fast the web was withdrawn from the bath. One could easily achieve a coating thickness of from less than one hundred nanometers to tens of microns in a matter of 1 second to 10 seconds. Samples c-PI-0 and Sample c-PAN-0 were subjected to dip coating treatments to obtain a coating with a thickness of 230 nm and 175 nm, respectively.

Example 6

Chemical Vapor Deposition of Si on Conductive Webs

The CVD formation of silicon films on several webs prepared in Examples 1-4 were carried out using a mixture of monosilane ($SiH_4$) and hydrogen gas. The process was performed between 500° C. and 800° C. with a silane partial pressure of 0.2 to 10 mbar to a total pressure of the silane-hydrogen mixture of 100 to 990 mbar. The growth rates were found to vary from approximately 55 nm/hour to 10 μm/min.

Hexachlorodisilane ($Si_2Cl_6$) is a silicon halide dimer that is an excellent alternative to silane ($SiH_4$) and mono-silicon chlorides ($SiH_2Cl_2$) as a source for chemical vapor deposition (CVD) of silicon, silicon nitride, silicon dioxide, and metal silicide films. $Si_2Cl_6$ is a non-flammable liquid which, due to its room temperature vapor pressure of 4 mm, can be conveniently transported to a CVD reactor by passing $H_2$ or an insert gas through a bubbler containing the liquid. The decomposition also could proceed in the absence of hydrogen. Thin-film coatings may be deposited at lower temperatures than those required for $SiCl_4$ (1,100° C.) or $SiH_2Cl_2$ and is safer than using spontaneously flammable $SiH_4$.

Silicon coatings were prepared in a horizontal hot-walled system by passing $Si_2Cl_6$ vapor in either a nitrogen-hydrogen carrier gas over horizontal substrates at temperatures from 425° C. to 850° C. In an atmosphere pressure system with a $Si_2Cl_6$ flow rate of $7 \times 10^{-3}$ moles/hr (or 400 cc/min of gas through bubbler) in 2,000 cc/min of carrier gas, the growth rate could vary from 50 nm/hr at 450° C. to 20 μm/min at 850° C., depending upon the flow rate. Above 700° C. the growth rate increases sharply with temperature. Presumably the growth rate would further increase above 850° C., but it would become more challenging to control the coating uniformity. Below 700° C. the growth rate is less temperature dependent.

CVD coatings with a thickness of approximately 85 nm were deposited on the surfaces of Sample c-PAN-5 and Sample c-PAN-10. Shown in FIGS. 6(A) and 6(B) are scanning electron micrographs (SEM) of PAN-5 and PAN-10, respectively.

It may be noted that CVD coating can be a continuous process amenable to low-cost mass production. For instance, Kirkbride, et al., (U.S. Pat. No. 4,019,887, Jun. 10, 1975) have proposed a continuous CVD coating process that can be adapted for silicon, silicon oxide, and other coatings on the conductive webs. A coating containing silicon can be produced on a web by moving the web, at a temperature of 400-850° C., past a coating station to which silane-containing gas is supplied. The gas is released close to the glass surface into a hot zone opening towards the web surface and at a substantially constant pressure across that surface. Non-oxidizing conditions are maintained in the hot zone, and the coating is produced by pyrolysis of the gas on the web surface. For the production of silicon oxide and nitride coatings, the reactant gases can contain $CO_2$ and $NH_3$, respectively.

The ability to mass produce coated webs (e.g., based on low-cost electro-spun fibrils and NGPs) makes the present invention particularly attractive for industrial-scale manufacturing of lithium ion anodes. This is in sharp contrast to the approach proposed by Chan, et al. [Ref. 26] that entails growing Si nano wires from a steel current collector, which is a slow and expensive process.

Example 7

Chemical Vapor Deposition of $SnO_x$ on Conductive Webs

Monobutyltin trichloride ($C_4H_9SnCl_3$) was vaporized by heating to 150° C. in an evaporator. A carrier gas, which was nitrogen gas generated by a compressor and maintained at a pressure of 1 kg/cm² by a reduction valve, was sent to the evaporator at a flow rate of 50 liters/min. The vapor of the tin compound was carried on the carrier gas and sent to a mixer. The vapor of the tin compound mixed in the mixer was impinged onto the surface of a conductive web (Sample NGP-100 and Sample NGP-CNF-20) kept at a high temperature of 575° C.-750° C. and conveyed by a conveying roller to form a tin oxide coating on the web surface. The web was caused to travel at a speed of 1 m/min by the conveying roller. Under these conditions, the tin oxide coating was formed for 10 minutes. The thickness of the resulting tin oxide coating was found to be from 60 nm to 210 nm.

Example 8

Physical Vapor Deposition of Sn or Tin Alloys on Conductive Webs

Figure 8:
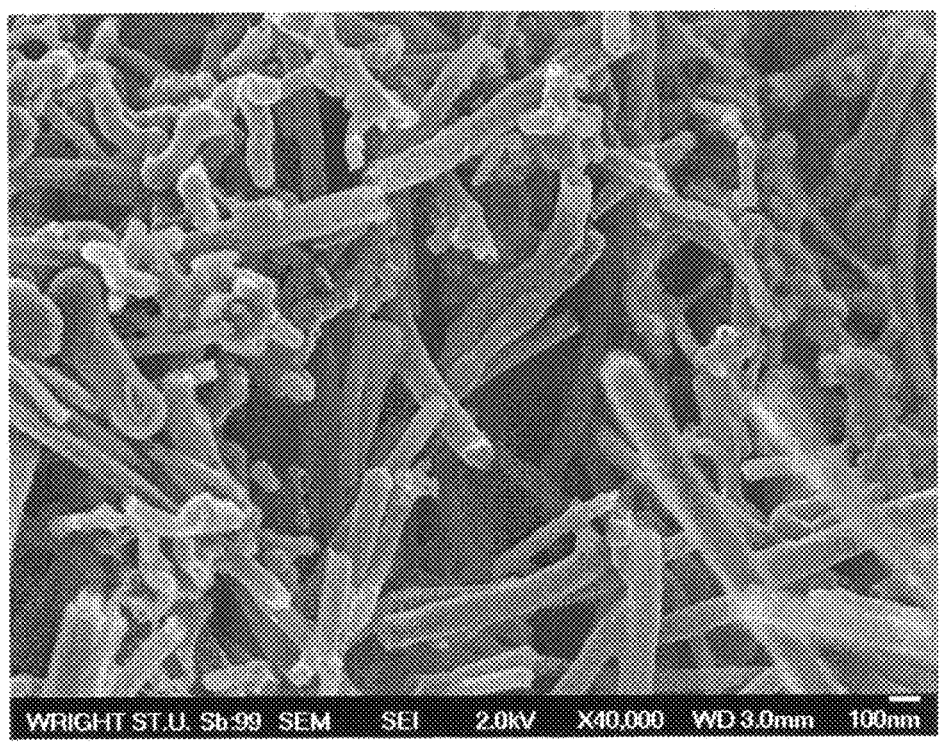
FIG. 8 SEM of treated CNFs.

About 5 grams of Sn powder were put in a tungsten heating boat. Approximately 5 grams of an CNF-based web (Sample CNF, FIG. 8) supported by a quartz plate of 30 cm×5 cm and the Sn-loaded tungsten boat were mounted in a vacuum chamber, which was evacuated to and maintained at a pressure of $10^{-5}$ torr for 3 hours at room temperature. An electric current was passed directly on the tungsten boat to heat the loaded Sn up to 240° C., which is slightly above its melting point. The evaporation was controlled by monitoring the deposited thickness with a quartz crystal microbalance mounted near the web. The deposition rate was controlled to be about 2 nm/min and the deposition time was approximately 1 hours. The resulting product was a hybrid material containing a Sn thin film coating (approximately 125 nm thick) on the conductive web. A Sn-coated web was prepared under comparable conditions from Sample CNT.

To obtain Sn alloy coatings, a desired amount of alloying elements (e.g., Bi with a melting point of 271.4° C.) may be loaded to the same or a different tungsten boat (now at a temperature higher than the melting point of Bi). The alloying elements may then be heated to above their melting points, generating another stream of vapors, which will co-deposit with Sn on the web substrate.

Example 9

Evaluation of Electrochemical Performance of Various Coated Filament Webs

The electrochemical properties were evaluated under an argon atmosphere by both cyclic voltammetry and galvanostatic cycling in a three-electrode configuration, with the coated filament web-copper substrate as the working electrode and Li foil as both reference and counter-electrodes. A conductive adhesive was used to bond the filament end portions to the copper foil, which serves as a current collector. Charge capacities were measured periodically and recorded as a function of the number of cycles. The charge capacity herein referred to is the total charge inserted into the coated filament web, per unit mass of the coated filament (counting both coating and substrate filament weights), during Li insertion, whereas the discharge capacity is the total charge removed during Li extraction. The morphological or micro-structural changes of selected samples after a desired number of repeated charging and recharging cycles were observed using both transmission electron microscopy (TEM) and scanning electron microscopy (SEM).

Figure 9:
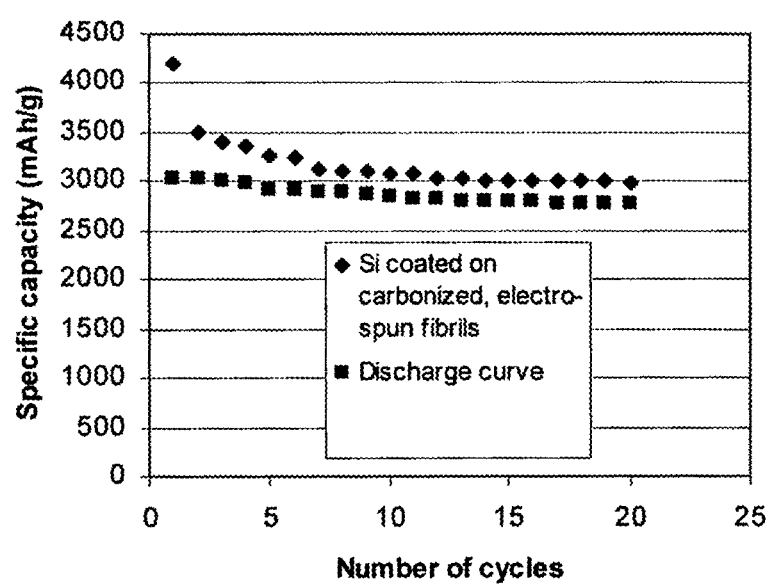
FIG. 9 Specific capacities of Si dip-coated Sample c-PI-0 (carbonized, electro-spun PI fibrils) plotted as a function of the number of charge and discharge cycles.

FIG. 9 shows the results of a study on specific capacities of Si dip-coated Sample c-PI-0, which was based on electro-spun PI fibrils that were carbonized at 1,000° C. The specific capacities were plotted as a function of the number of charge and discharge cycles. Similarly, FIG. 10 shows specific capacities of Si dip-coated Sample c-PAN-0 (carbonized, electro-spun PAN fibrils) also plotted as a function of the number of charge and discharge cycles.

It is of significance to note that simple dip-coating of carbon nano fibers in molten Si was effective in producing an anode material that exhibits a reversible specific capacity as high as 2,755-3,040 mAh/g (based on per unit gram of the hybrid Si/CNF material). This is as high as 7-8 times the theoretical capacity of a graphite anode material. Dip coating of webs can be a continuous and fast process and is amenable to mass production of high-capacity anode materials. This is a highly surprising result.

Figure 11B:
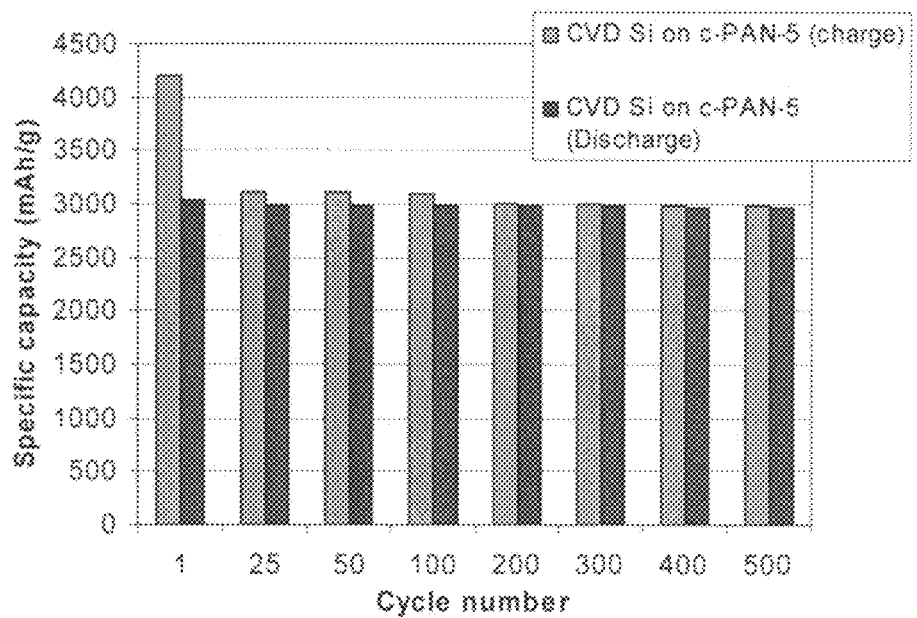
FIG. 11 Specific capacities of CVD Si-coated Sample c-PAN-5 (carbonized, electro-spun NGP-containing PAN fibrils) plotted as a function of the number of charge and discharge cycles: (A) up to 25 cycles; and (B) up to 500 cycles.

Shown in FIG. 11(A) and FIG. 11(B) are the specific capacities of CVD Si-coated Sample c-PAN-5 (carbonized, electro-spun NGP-containing PAN fibrils) plotted as a function of the number of charge and discharge cycles. The reversible specific capacity remains almost 3,000 mAh/g even after 500 cycles. It may be noted that Chan, et al. [Ref. 26] only showed the data for their Si nanowire-based electrode up to 10 cycles of charge-discharge. It was not clear how their electrode would respond to a larger number of cycles.

It may be further noted that the electrochemical responses of the presently invented hybrid nano material-based anodes are superior to those of amorphous, thin Si films (directly coated on a current collector) in terms of both a high reversible specific capacity and long cycle life, as reported in [Refs. 36-44]. Our anode materials perform the best in terms of reversible specific capacity, with only one exception [Ref. 44], in which Jung, et al. reported a high discharge capacity of approximately 4,000 mAh/g in one particular case. However, the capacity drops precipitously after 15 cycles in this case.

Figure 12:
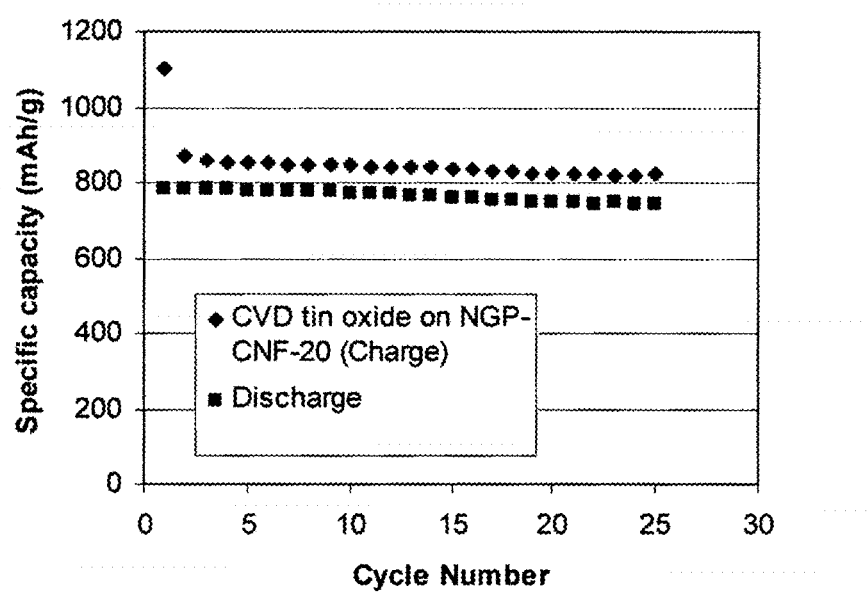
FIG. 12 Specific capacities of CVD tin oxide-coated Sample NGP-CNF-20 (a web of mixed NGPs and CNFs) plotted as a function of the number of charge and discharge cycles.
Figure 13:
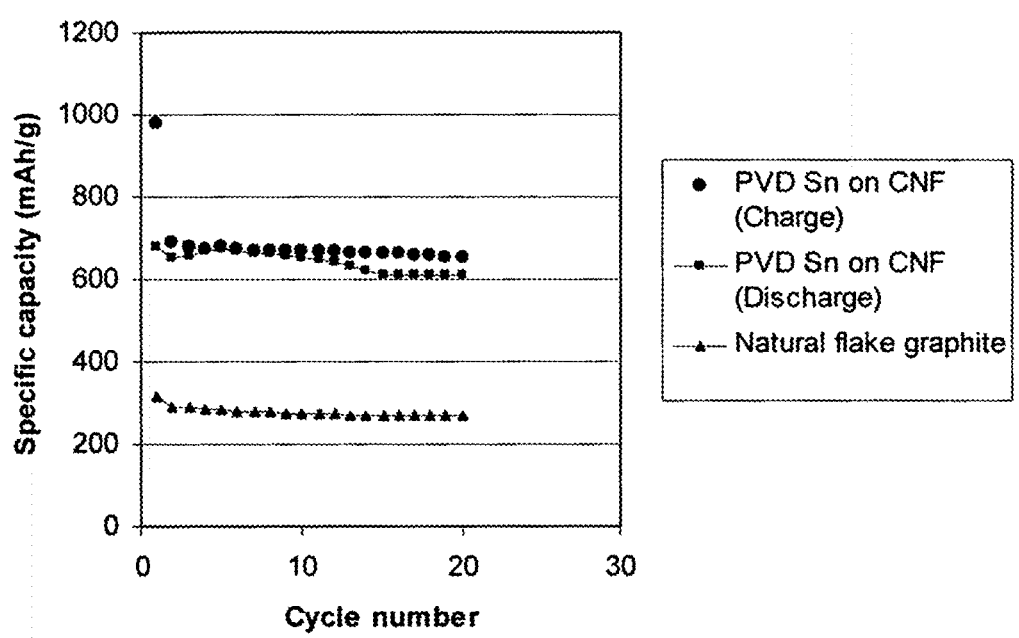
FIG. 13 Specific capacities of PVD Sn-coated Sample CNF (a web of CNFs) plotted as a function of the number of charge and discharge cycles.

FIG. 12 shows the specific capacities of CVD tin oxide-coated Sample NGP-CNF-20 (a web of mixed NGPs and CNFs) plotted as a function of the number of charge and discharge cycles. The results are far better than the values reported for $SiO_2$-based anode systems in [Refs. 45-47]. The specific capacities of PVD Sn-coated Sample CNF (a web of CNFs) are plotted as a function of the number of charge and discharge cycles in FIG. 13. The results again are better than state-of-the-art Sn-based anodes [e.g., Ref. 48] in light of both a high reversible specific capacity and a long cycle life.

In summary, the present invention provides an innovative, versatile platform materials technology that enables the design and manufacture of superior anode materials for lithium ion batteries or other types of rechargeable batteries. This new technology appears to have the following main advantages:

(1) The approach of using highly conductive, nano-scaled filaments (nanometer-scale diameter or thickness) to support an anode active material coating proves to be a superior strategy, which is applicable to a wide range of coating materials that have a high Li-absorbing capacity. The geometry of the underlying filament enables the supported coating to freely undergo strain relaxation in transverse directions. The coating does not lose its contact with the underlying substrate filament upon repeated charge/discharge cycles. This has proven to be a robust configuration.

(2) With the active material coating thickness less than 1 µm (thinner than 100 nm in many cases), the distance that lithium ions have to travel is short. The anode can quickly store or release lithium and thus can carry high currents. This is a highly beneficial feature for a battery that is intended for high power density applications such as electric cars.

(3) The interconnected network of filaments forms a continuous path for electrons, resulting in significantly reduced internal energy loss or internal heating.

(4) In the instant invention, the coating is wrapped around a filament and, even if the coating were fractured into separate segments, individual segments would remain in physical contact with the underlying filament, which is essentially part of the current collector. The electrons generated can still be collected.

(5) The anode material in the present invention provides an exceptionally high reversible specific capacity. Even when the weight of the filaments is accounted for, the maximum capacity can still be exceptionally high since the underlying filament normally occupies only a very small weight fraction of the total hybrid nano material. A specific capacity as high as 3,000-4,000 mAh/g (based on per gram of the coated filament) can be achieved. This is still 8-10 times higher than the theoretical specific capacity of 372 mAh/g for the graphite anode material. Furthermore, the Li ion batteries featuring the presently invented coated filament-based nano hybrid anode material exhibit superior multiple-cycle behaviors with only a small capacity fade and a long cycle life.

The invention claimed is:

1. A lithium secondary battery comprising a positive electrode, a negative electrode comprising a hybrid nano-filament composition which is capable of absorbing and desorbing lithium ions, and a non-aqueous electrolyte disposed between said negative electrode and said positive electrode, wherein said hybrid nano-filament composition comprises:
   a) An aggregate of nanometer-scaled, electrically conductive carbon filaments that are interconnected, intersected, or percolated to form a porous, electrically conductive filament network comprising interconnected pores for accommodating said non-aqueous electrolyte, wherein said nanometer-scaled, electrically conductive carbon filaments have an elongate dimension and a first transverse dimension, which is a diameter or a thickness, said first transverse dimension being less than 500 nm and an aspect ratio of said elongate dimension to said first transverse dimension greater than 10, and wherein said nanometer-scaled, electrically conductive carbon filaments are carbonized electro-spun fibers; and
   b) Micron- or nanometer-scaled coating that is deposited on a surface of said nanometer-scaled, electrically conductive carbon filaments, wherein said coating deposited on said nanometer-scaled, electrically conductive carbon filaments comprises an negative active material capable of absorbing and desorbing lithium ions and said coating has a thickness less than 20 µm; wherein said nanometer-scaled, electrically conductive carbon filaments enable said deposited coating to freely undergo strain relaxation in transverse directions so that said coating does not lose contact with said nanometer-scaled, electrically conductive carbon filaments during charge/discharge cycles of the lithium secondary battery, wherein said coating is wrapped around said nanometer-scaled, electrically conductive carbon filament, wherein said coating deposited on said nanometer-scaled, electrically conductive carbon filaments comprises said negative active material selected from the group consisting of:
   i. germanium (Ge), antimony (Sb), bismuth (Bi), zinc (Zn), aluminum (Al), and cadmium (Cd);
   ii. alloys or intermetallic compounds of Ge, Sb, Bi, Zn, Al, or Cd with other elements, wherein said alloys or compounds are stoichiometric or non-stoichiometric;
   iii. oxides, carbides, nitrides, sulfides, phosphides, selenides, and tellurides of Ge, Sb, Bi, Zn, Al, I or Cd, and their mixtures or composites; and
   iv. combinations thereof.

2. The lithium secondary battery of claim 1 wherein said nanometer-scaled, electrically conductive carbon filaments have a transverse dimension smaller than 100 nm or said coating has a thickness smaller than 1 µm.

3. The lithium secondary battery of claim 1 wherein said coating has a thickness smaller than 200 nm.

4. The lithium secondary battery of claim 1 wherein said nanometer-scaled, electrically conductive carbon filaments comprise an electrically conductive, electro-spun polymer fiber, electro-spun polymer nanocomposite fiber comprising a conductive filler, nano carbon fiber obtained from carbonization of an electro-spun polymer fiber, electro-spun pitch fiber, or a combination thereof.

5. The lithium secondary battery as defined in claim 1 wherein the coating comprises Ge as a primary element with a Ge content no less than 50% by weight based on the total weight of the coating.

6. The lithium secondary battery as defined in claim 2 wherein the coating comprises Ge as a primary element with Ge content no less than 50% by weight based on the total weight of the coating.

7. The lithium secondary battery as defined in claim 1 wherein the coating comprises an element selected from Ge, Cd, Sb, Bi, Zn, or a combination thereof.

8. The lithium secondary battery according to claim 1, wherein said positive electrode comprises lithium cobalt oxide, lithium nickel oxide, lithium manganese oxide, lithium iron phosphate, lithium vanadium phosphate, or a combination thereof.

9. The lithium secondary battery as defined in claim 1, wherein said hybrid nano-filament composition further comprises a binder material selected from a polymer, coal tar pitch, petroleum pitch, meso-phase pitch, coke, or a derivative thereof.

10. The lithium secondary battery as defined in claim 1, wherein said hybrid nano-filament composition provides a specific capacity of no less than 1,000 mAh per gram of the anode composition.

11. The lithium secondary battery as defined in claim 1, wherein said hybrid nano-filament composition provides a specific capacity of no less than 2,000 mAh per gram of the anode composition.

12. The lithium secondary battery as defined in claim 1, wherein said hybrid nano-filament composition provides a specific capacity of no less than 3,000 mAh per gram of the anode composition.

13. An electrochemical cell electrode comprising a hybrid nano-filament composition, said hybrid nano-filament composition comprising:
   a) an aggregate of nanometer-scaled, electrically conductive graphene platelets that are interconnected, intersected, or percolated to form a porous, electrically conductive graphene platelets network comprising interconnected pores, wherein said nanometer-scaled, electrically conductive graphene platelet has a length and a thickness, said thickness being no greater than 100 nm, and a length-to-thickness aspect ratio no less than 10; and
   b) micron- or nanometer-scaled coating that is deposited on a surface of said nanometer-scaled, electrically conductive graphene platelets, wherein said coating deposited on said nanometer-scaled, electrically conductive graphene platelets comprises an anode active material selected from the group consisting of:

i. germanium (Ge), antimony (Sb), bismuth (Bi), zinc (Zn), aluminum (Al), and cadmium (Cd);

ii. alloys or intermetallic compounds of Ge, Sb, Bi, Zn, Al, or Cd with other elements, wherein said alloys or compounds are stoichiometric or non-stoichiometric;

iii. oxides, carbides, nitrides, sulfides, phosphides, selenides, and tellurides of Ge, Sb, Bi, Zn, Al, or Cd, and their mixtures or composites; and iv. combinations thereof;

wherein said nanometer-scaled, electrically conductive graphene platelets enable said deposited coating to freely undergo strain relaxation in transverse directions so that said coating does not lose contact with said nanometer-scaled, electrically conductive graphene platelets during charge/discharge cycles of the electrochemical cell, wherein said coating is wrapped around said nanometer-scaled, electrically conductive graphene platelet.

* * * * *